(12) United States Patent
    Hu

(10) Patent No.: US 10,969,586 B2
(45) Date of Patent: Apr. 6, 2021

(54) ULTRA LIGHT-WEIGHT SEE-THROUGH DISPLAY GLASSES

(71) Applicant: Darwin Hu, San Jose, CA (US)

(72) Inventor: Darwin Hu, San Jose, CA (US)

(*) Notice: Subject to any disclaimer, the term of this patent is extended or adjusted under 35 U.S.C. 154(b) by 0 days.

(21) Appl. No.: 16/032,037

(22) Filed: Jul. 10, 2018

(65) Prior Publication Data
     US 2020/0018960 A1   Jan. 16, 2020

(51) Int. Cl.
     *G02B 27/01*    (2006.01)
     *G02B 27/18*    (2006.01)
     *G02B 27/30*    (2006.01)
     *G02B 27/10*    (2006.01)

(52) U.S. Cl.
     CPC ..... *G02B 27/0172* (2013.01); *G02B 27/0176* (2013.01); *G02B 27/102* (2013.01); *G02B 27/18* (2013.01); *G02B 27/30* (2013.01); *G02B 2027/015* (2013.01); *G02B 2027/0112* (2013.01); *G02B 2027/0152* (2013.01); *G02B 2027/0161* (2013.01); *G02B 2027/0178* (2013.01)

(58) Field of Classification Search
     CPC .............. G02B 27/017; G02B 27/0172; G02B 2027/0112; G02B 2027/0141; G02B 2027/0178; G02B 27/102; G02B 27/1026; G02B 27/104; G02B 27/1046
     USPC ................................................. 359/629–633
     See application file for complete search history.

(56) References Cited

U.S. PATENT DOCUMENTS

| | | | | |
|---|---|---|---|---|
| 5,003,300 A | * | 3/1991 | Wells | H04N 3/08 345/8 |
| 5,844,713 A | * | 12/1998 | Nanba | G02B 27/0172 359/364 |
| 6,139,166 A | * | 10/2000 | Marshall | G02B 27/144 362/230 |
| 9,030,747 B2 | * | 5/2015 | Tohara | G02B 27/0172 359/627 |
| 9,720,228 B2 | * | 8/2017 | Harrison | G02B 27/017 |
| 10,120,194 B2 | * | 11/2018 | Cobb | G02B 1/041 |
| 10,650,785 B1 | * | 5/2020 | Tuomisto | G02B 27/0172 |
| 2011/0019250 A1 | * | 1/2011 | Aiki | G02B 5/32 359/15 |
| 2012/0113092 A1 | * | 5/2012 | Bar-Zeev | G02B 27/0101 345/419 |
| 2013/0249945 A1 | * | 9/2013 | Kobayashi | G02B 17/006 345/633 |
| 2015/0234477 A1 | * | 8/2015 | Abovitz | G02B 27/0172 382/103 |
| 2016/0011419 A1 | * | 1/2016 | Gao | G02B 27/0172 359/471 |

(Continued)

*Primary Examiner* — Nicholas R. Pasko
(74) *Attorney, Agent, or Firm* — Joe Zheng

(57) ABSTRACT

Architecture and designs of wearable devices for displaying images or videos are described. According to one aspect of the present invention, a display device is made in form of a pair of glasses and includes a minimum number of parts to reduce the complexity and weight thereof. Image data along with control signals (including instruction data) is optically transported by an active optical cable all the way through a temple to a microdisplay embedded and deposed near one end of the temple of the glasses. Optical images produced by the microdisplay are captured and projected into an integrated lens or an added light waveguide on a lens for displaying the optical images before the eyes of a wearer.

13 Claims, 26 Drawing Sheets

(56) References Cited

U.S. PATENT DOCUMENTS

| | | | |
|---|---|---|---|
| 2016/0025984 A1* | 1/2016 | Hino | H04N 13/339 |
| | | | 345/8 |
| 2016/0033771 A1* | 2/2016 | Tremblay | G02B 26/10 |
| | | | 345/8 |
| 2017/0090851 A1* | 3/2017 | Takano | G02B 27/0101 |
| 2019/0129183 A1* | 5/2019 | Hu | G02B 27/0172 |
| 2019/0162967 A1* | 5/2019 | Hu | G02B 27/0172 |
| 2019/0171013 A1* | 6/2019 | Hu | G02B 6/4204 |
| 2019/0227319 A1* | 7/2019 | Trail | G02B 27/0081 |

* cited by examiner

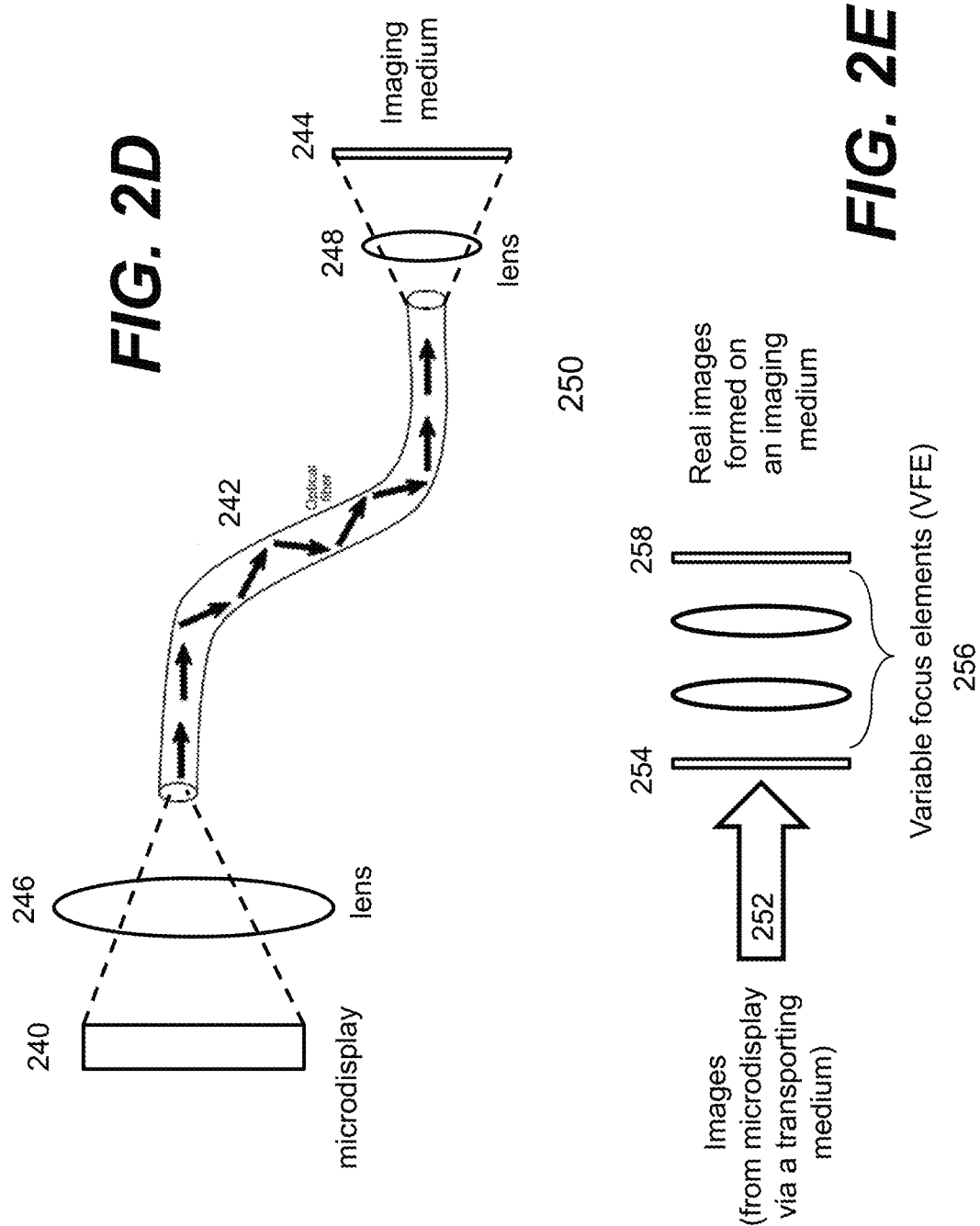

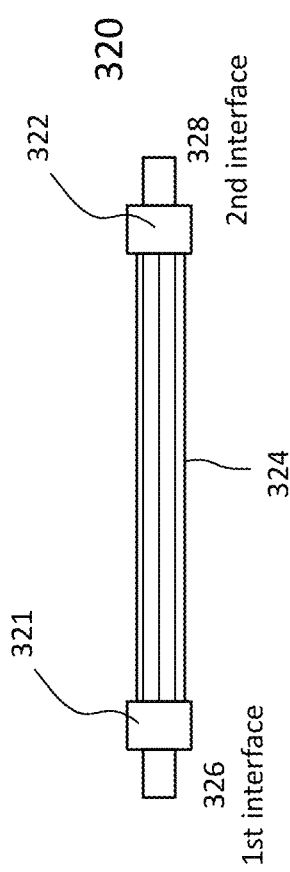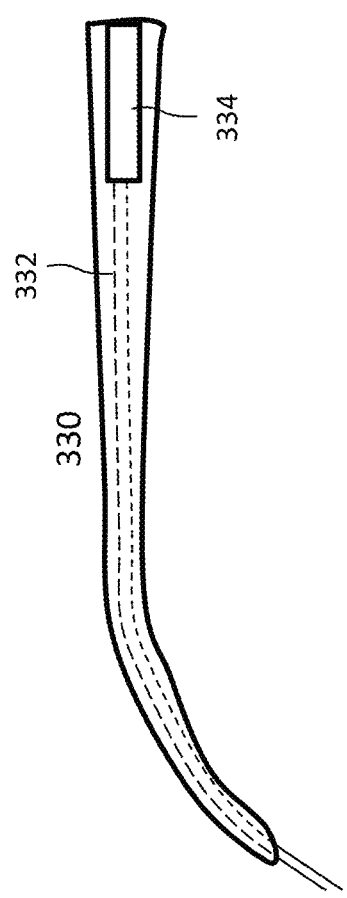

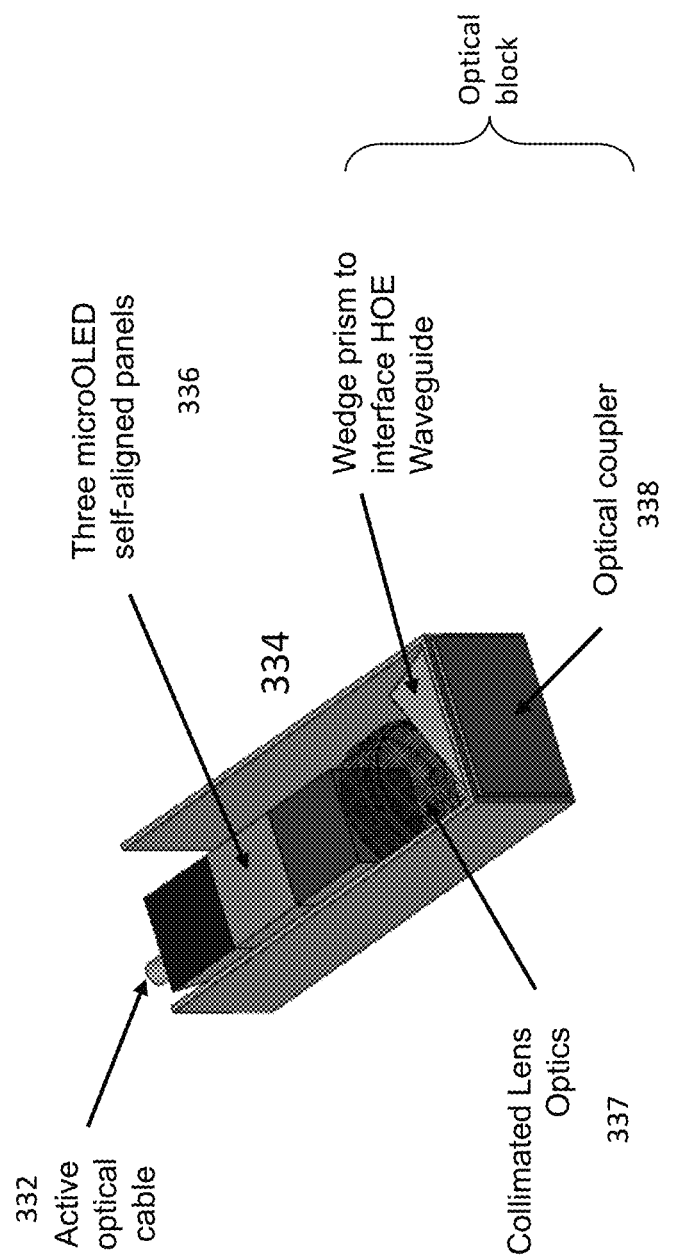
FIG. 3C.2

- Implementation of a 2 Panel System
  - One panel dedicated to green light for brightness enhancement
  - One panel color sequential between red and blue
- An alternative to R-G-B-G color sequential
- A hybrid architecture provides tradeoff between multiple panels and color sequential

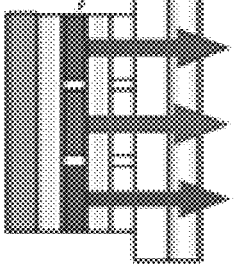
FIG. 4A.1

Typical Pixelation of μOLED/μLED Microdisplay

| | | |
|---|---|---|
| Pixel Configuration | | |
| Pixel Size | 9.9 μm × 9.9 μm | 7.8 μm × 7.8 μm |
| Aperture Ratio | 55 % | 96 % |

*FIG. 4A.2*

- Using RGB EL material for each color without RGB color filter.
- Cathode material : transparent alloy for top emission.
- Mask preparation : Active Area Mask for each color(Open size > 2.16 x 3.84mm, no need the fine subpixel mask.

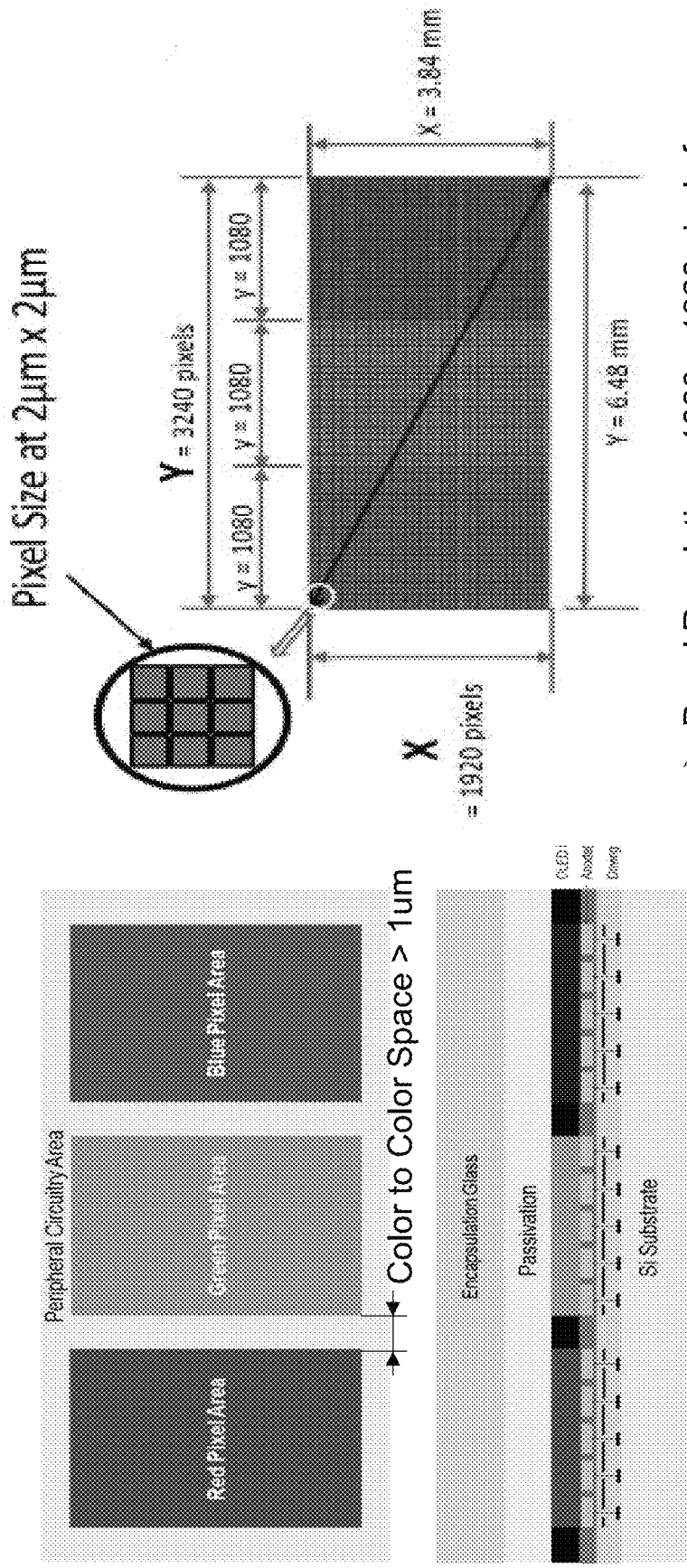

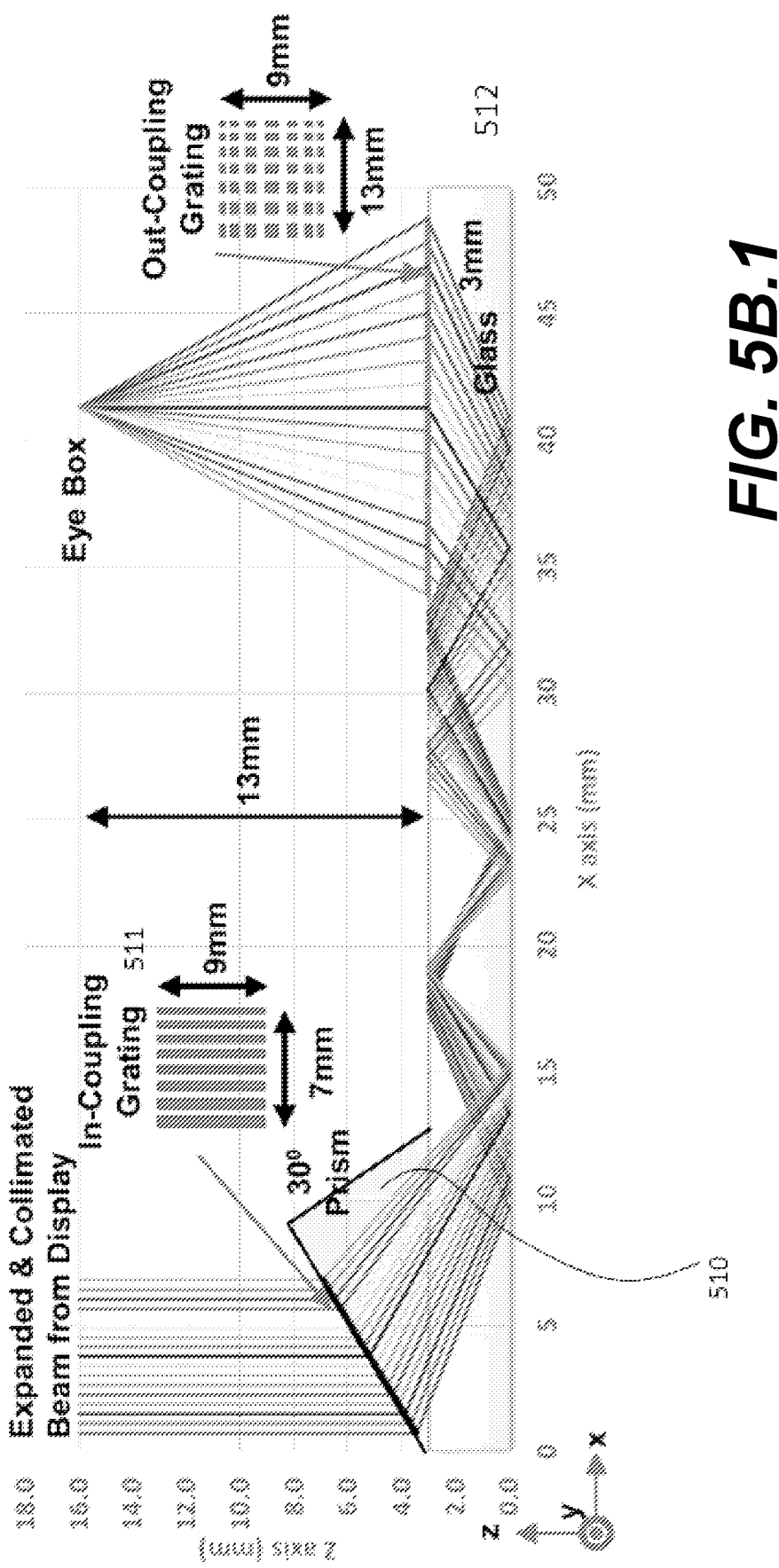
FIG. 5B.1

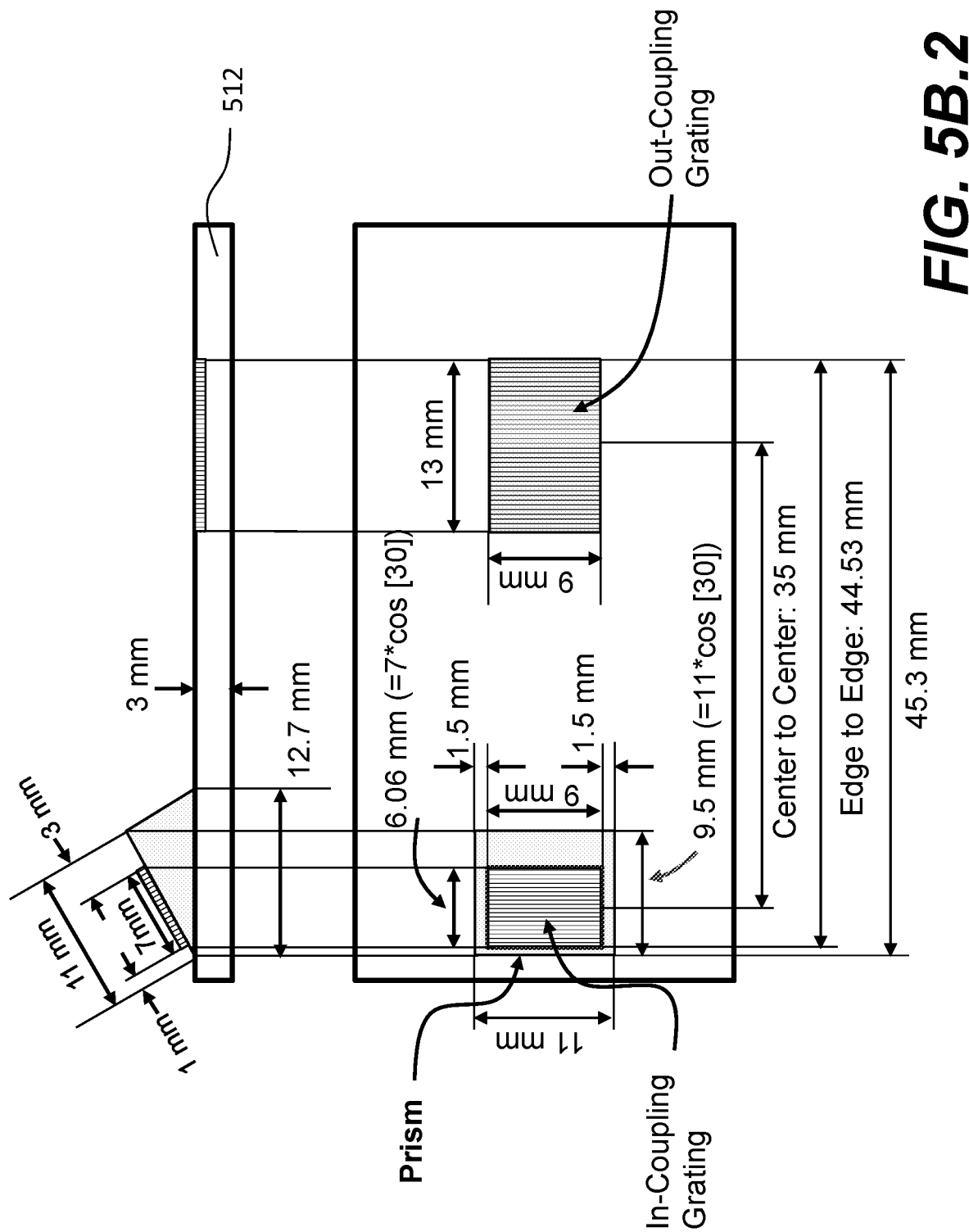
FIG. 5B.2

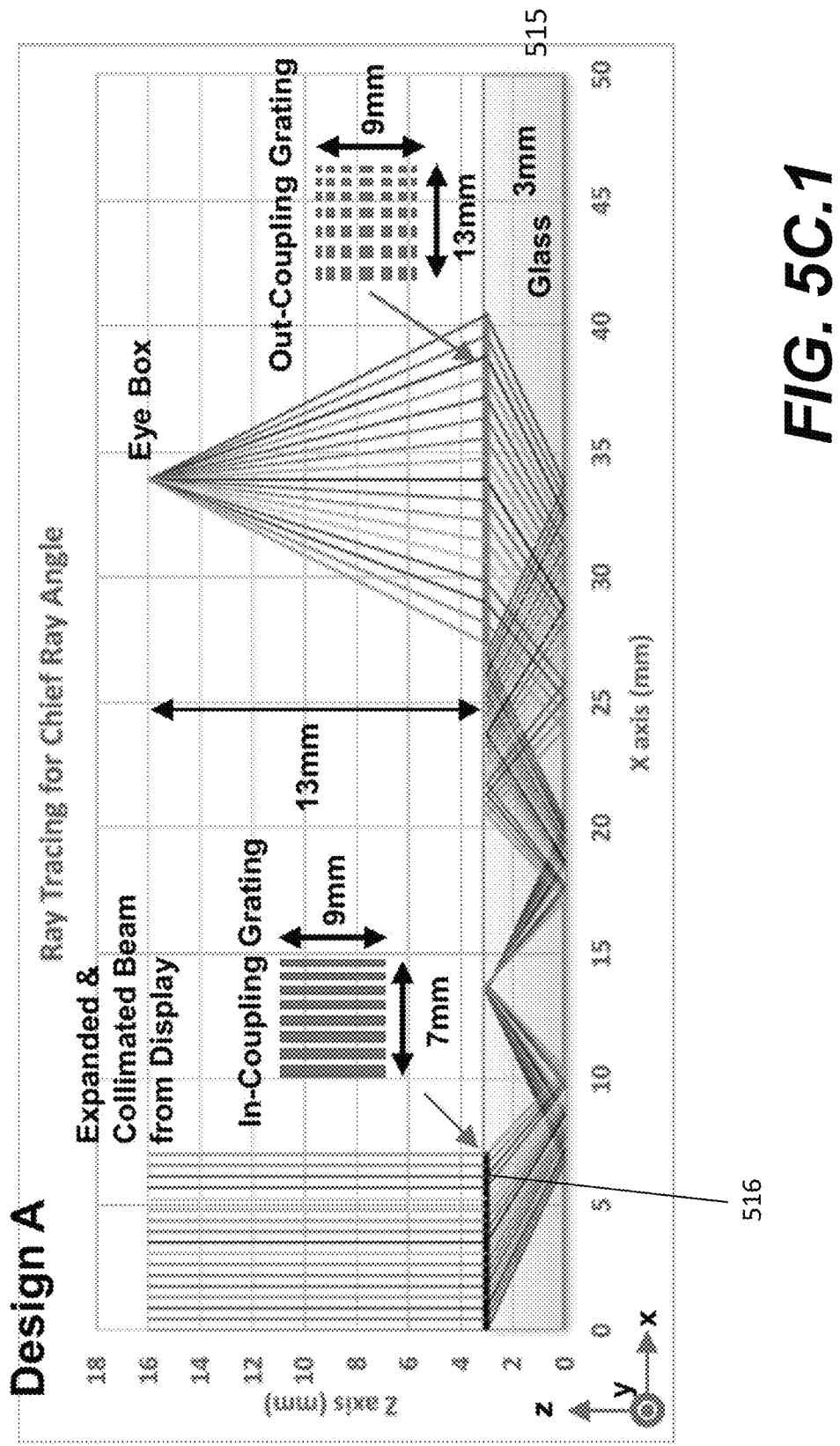
FIG. 5C.1

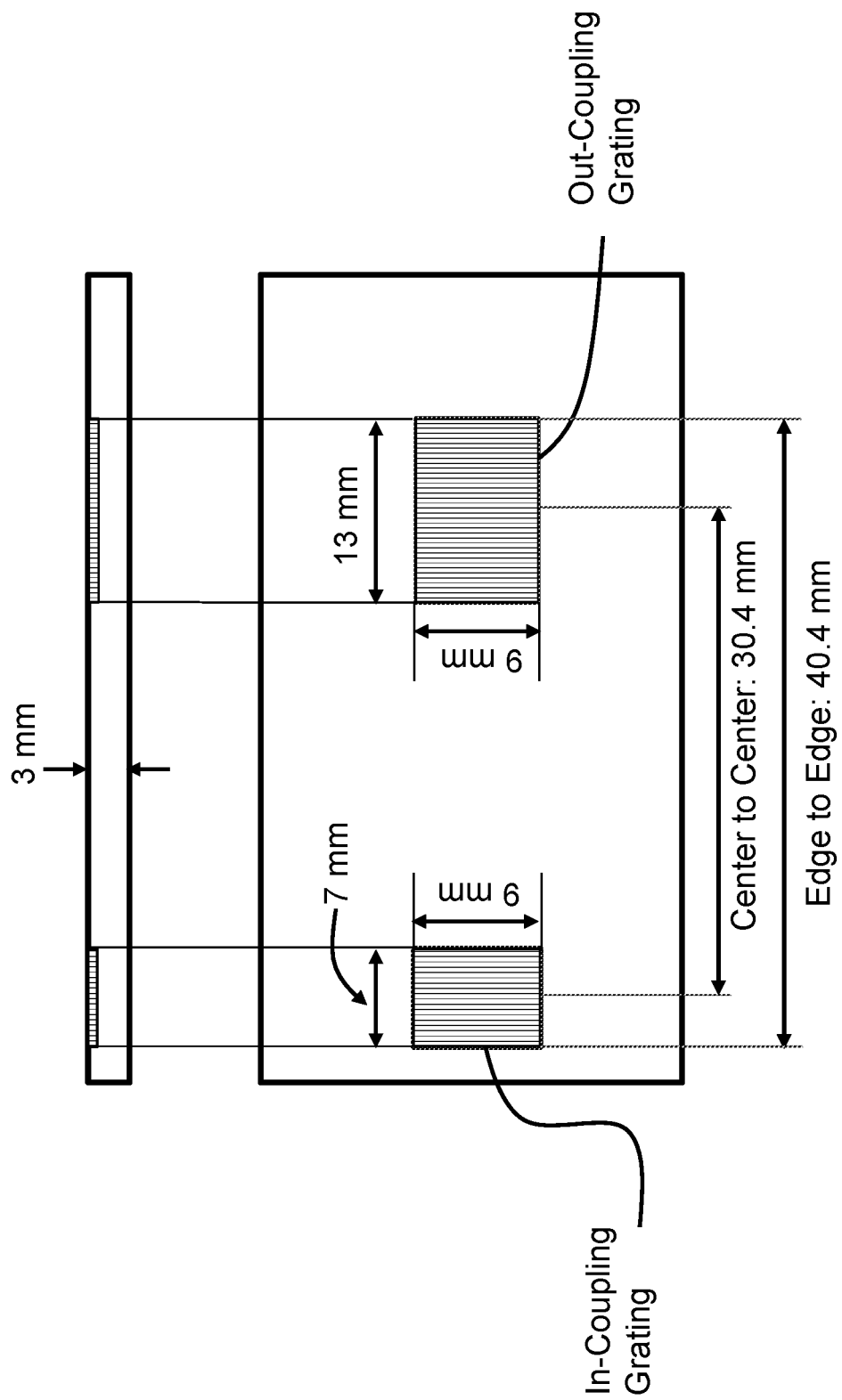
FIG. 5C.2

ULTRA LIGHT-WEIGHT SEE-THROUGH DISPLAY GLASSES

BACKGROUND OF THE INVENTION

Field of the Invention

The present invention generally relates to the area of display devices and more particularly relates to architecture and designs of display devices, where a display device is made in form of a pair of glasses, and may be used in various applications including virtual reality and augmented reality.

Description of the Related Art

Virtual Reality or VR is generally defined as a realistic and immersive simulation of a three-dimensional environment created using interactive software and hardware, and experienced or controlled by movement of the body. A person using virtual reality equipment is typically able to look around the artificially generated three-dimensional environment, moves around in it and interacts with features or items that are depicted on a screen or in goggles. Virtual realities artificially create sensory experiences, which can include sight, touch, hearing, and, less commonly, smell.

Augmented reality (AR) is a technology that layers computer-generated enhancements atop an existing reality in order to make it more meaningful through the ability to interact with it. AR is developed into apps and used on mobile devices to blend digital components into the real world in such a way that they enhance one another, but can also be told apart easily. AR technology is quickly coming into the mainstream. It is used to display score overlays on telecasted sports games and pop out 3D emails, photos or text messages on mobile devices. Leaders of the tech industry are also using AR to do amazing and revolutionary things with holograms and motion activated commands.

The delivery methods of Virtual Reality and Augmented Reality are different when viewed separately. Most 2016-era virtual realities are displayed either on a computer monitor, a projector screen, or with a virtual reality headset (also called head-mounted display or HMD). HMDs typically take the form of head-mounted goggles with a screen in front of the eyes. Virtual Reality actually brings the user into the digital world by cutting off outside stimuli. In this way user is solely focusing on the digital content being displayed in the HMDs. Augmented reality is being used more and more in mobile devices such as laptops, smart phones, and tablets to change how the real world and digital images, graphics intersect and interact.

In reality, it is not always VR vs. AR as they do not always operate independently of one another, and in fact are often blended together to generate an even more immersing experience. For example, haptic feedback, which is the vibration and sensation added to interaction with graphics, is considered an augmentation. However, it is commonly used within a virtual reality setting in order to make the experience more lifelike though touch.

Virtual reality and augmented reality are great examples of experiences and interactions fueled by the desire to become immersed in a simulated land for entertainment and play, or to add a new dimension of interaction between digital devices and the real world. Alone or blended together, they are undoubtedly opening up worlds, both real and virtual alike.

FIG. 1A shows an exemplary goggle now commonly seen in the market for the application of delivering or displaying VR or AR. No matter how a goggle is designed, it appears bulky and heavy, and causes inconvenience when worn on a user. Further most of the goggles cannot be seen through. In other words, when a user wears a goggle, he or she would not be able to see or do anything else. Thus, there is a need for an apparatus that can display the VR and AR but also allows a user to perform other tasks if needed.

Various wearable devices for VR/AR and holographic applications are being developed. FIG. 1B shows a sketch of HoloLens from Microsoft. It weights 579 g (1.2 lbs). With the weight, a wearer won't feel comfortable when wearing it for a period. Indeed, what is available in the market is generally heavy and bulky in comparison to normal glasses. Thus there is a further need for a wearable AR/VR viewing or display device that looks similar to a pair of regular glasses but is also amenable to smaller footprint, enhanced impact performance, lower cost packaging, and easier manufacturing process.

SUMMARY OF THE INVENTION

This section is for the purpose of summarizing some aspects of the present invention and to briefly introduce some preferred embodiments. Simplifications or omissions in this section as well as in the abstract and the title may be made to avoid obscuring the purpose of this section, the abstract and the title. Such simplifications or omissions are not intended to limit the scope of the present invention.

The present invention is generally related to architecture and designs of ultra light-weight wearable devices for displaying images or videos, e.g., virtual reality and augmented reality applications. According to one aspect of the present invention, a display device is made in form of a pair of glasses and includes a minimum number of parts to reduce the complexity and weight thereof. A separate case or enclosure is provided as portable to be affixed or attached to a user (e.g., a pocket or waist belt). The enclosure includes all necessary parts and circuits to generate content and is coupled to the wearable device via an active optical cable, resulting in a minimum number of parts needed on the glasses, hence smaller footprint, enhanced impact performance, lower cost packaging, and easier manufacturing process of the glasses. The content along with control signals (including instruction data) is optically transported by the active optical cable all the way through a temple to a microdisplay embedded and deposed near one end of the temple of the glasses. Optical images produced by the microdisplay are captured and projected into an integrated lens or an added light waveguide on a lens for displaying the optical images before the eyes of a wearer.

According to another aspect of the present invention, each of the lenses includes an optical waveguide that propagates an optical image being projected onto one end of the waveguide to another end with an optical path that a user can see the optical image. The waveguide may also be integrated with or stacked on an optical correcting lens to form an integrated lens for the glasses.

According to still another aspect of the present invention, the microdisplay includes one or more panels, each of the panels displays a designated colored image (e.g., a Red, Green or Blue image). Optical images of light intensities from the colored images of the one or more panels are deflected by a set of mirrors coated with optical materials to one side of the microdisplay.

According to still another aspect of the present invention, a focusing mechanism (controllable one or more lenses) is provided to capture the optical images and projects these images into the integrated lens or the added light waveguide for displaying the optical images before the eyes of a wearer.

According to still another aspect of the present invention, the display panels are amenable to perfect alignment in panels and in pixels, smaller footprint, enhanced impact performance, lower cost packaging, and easier manufacturing process. Each of display panels does not need pixel-based masking, meaning neighboring pixels won't be for different colors. All pixels in one display panel or any array of pixels are all set for displaying a single colored image (e.g., Red, Green or Blue), making the manufacturing process simpler and less costly.

According to still another aspect of the present invention, an integrated lens may be further coated with one for more films with optical characteristics that amplify the optical image before the eyes of the user.

According to yet another aspect of the present invention, the glasses include a few electronic devices (e.g., sensor or microphone) to enable various interactions between the wearer and the displayed content. Signals captured by a device (e.g., a depth sensor) are transmitted to the enclosure via wireless means (e.g., RF or Bluetooth) to eliminate the wired connections between the glasses and the enclosure.

The present invention may be implemented as an apparatus, a method and part of system. Different implementations may yield different benefits, objects and advantages. In one embodiment, the present invention is a display apparatus for displaying a color image, the display apparatus comprises: a lens; a temple with a first end and a second end; an optical image generator including a microdisplay and embedded and disposed near the first end of the temple; a light waveguide, integrated onto the lens; a focusing mechanism, disposed between the optical image generator and the light waveguide, capturing an optical image from the optical image generator and projecting the optical image into the light waveguide, wherein the optical image into the light waveguide, wherein the optical image is seen through the light waveguide by a user. The temple includes an active optical cable entering the temple from the second end and extending to the optical image generator.

In another embodiment, the present invention is a method for displaying a color image on a display apparatus, the method comprising: transporting image data and control signals from an enclosure via an active optical cable including at least two wires and one optical fiber; generating optical images from one or more display panels in a microdisplay deposed near a first end of a temple in the display apparatus, wherein the microdisplay is coupled to the active optical cable within the temple; capturing the optical images by a focusing mechanism disposed between the microdisplay and a light waveguide; and projecting the optical images into the light waveguide, wherein the optical image integrated with a lens and is seen through the light waveguide by a user.

In yet another embodiment, the present invention is an optical image generator generating optical images (light intensities) from image data. The optical image generator comprises: a substrate; and an array of elements deposed on the substrate, the array of elements being divided into a first group, a second group, and a third group, wherein the elements in the first group, the second group, and the third group are respectively deposed with a layer of first homogeneous color filters, second homogeneous color filters and third homogeneous color filters, and wherein the elements in the first group, the second group, and the third group are charged to display three individual colored images. The optical image generator further comprises a set of mirrors, each of the mirrors deposed for and facing, at an angle, one of the first group, the second group, and the third group of elements. As a result, each of the mirrors produces an optical colored image from a displayed image on each of the first group, the second group, and the third group of elements.

There are many other objects, together with the foregoing attained in the exercise of the invention in the following description and resulting in the embodiment illustrated in the accompanying drawings.

BRIEF DESCRIPTION OF THE DRAWINGS

These and other features, aspects, and advantages of the present invention will become better understood with regard to the following description, appended claims, and accompanying drawings where:

FIG. 2D shows how an image is being transported from a microdisplay via a fiber cable to an imaging medium;

FIG. 2E shows a set of exemplary variable focus elements (VFE) to accommodate an adjustment of the projection of an image onto an optical object (e.g., an imaging medium or a prism);

FIG. 3B shows an example of an active optical cable that includes two ends, and a cable portion having at least one optical fiber and two wires;

FIG. 3C.1 shows an example of a temple that may be used in one embodiment of the display glasses described in the present invention;

FIG. 3C.2 shows an exemplary implementation of an optical image fixture or generator that includes a microdisplay, a focusing mechanism (e.g., an collimator) and an optical coupler;

FIG. 4A.1 shows two types of μOLED display pixel structure, individual RGB elements and white OLED as background;

FIG. 4A.2 shows typical pixilation of μOLED and μLED microdisplay pixel configuration;

FIG. 4C shows three arrays are respectively done (e.g., masked) for a designated color;

FIG. 4D shows some details of three OLED-based panels in a microdisplay used to produce a full color optical image to be displayed in a pair of display glasses according to one embodiment of the present invention;

FIG. 5B.1 and FIG. 5B.2 show an exemplary implementation of a waveguide or light bar with ray tracing of projected optical images using an optical block integrated with an light incident light coupling (e.g., Holographic Optical Element);

FIG. 5C.1 and FIG. 5C.2 show an exemplary implementation of a waveguide or light bar with ray tracing of projected optical images using an light incident light coupling (e.g., Holographic Optical Element) integrated right onto one end of the light bar;

DETAILED DESCRIPTION OF THE PREFERRED EMBODIMENTS

The detailed description of the invention is presented largely in terms of procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Embodiments of the present invention are discussed herein with reference to FIGS. 2A-5D. However, those skilled in the art will readily appreciate that the detailed description given herein with respect to these figures is for explanatory purposes as the invention extends beyond these limited embodiments.

Figure 1A:
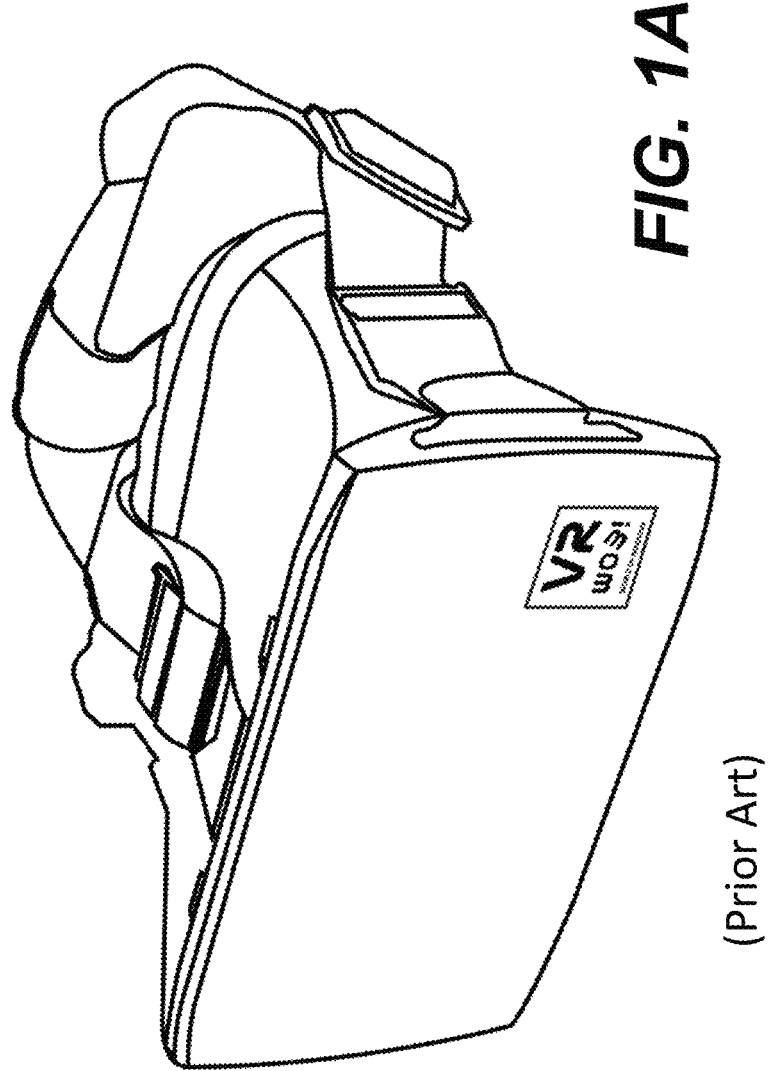
FIG. 1A shows an exemplary goggle now commonly seen in the market for the application of delivering or displaying VR or AR.
Figure 1B:
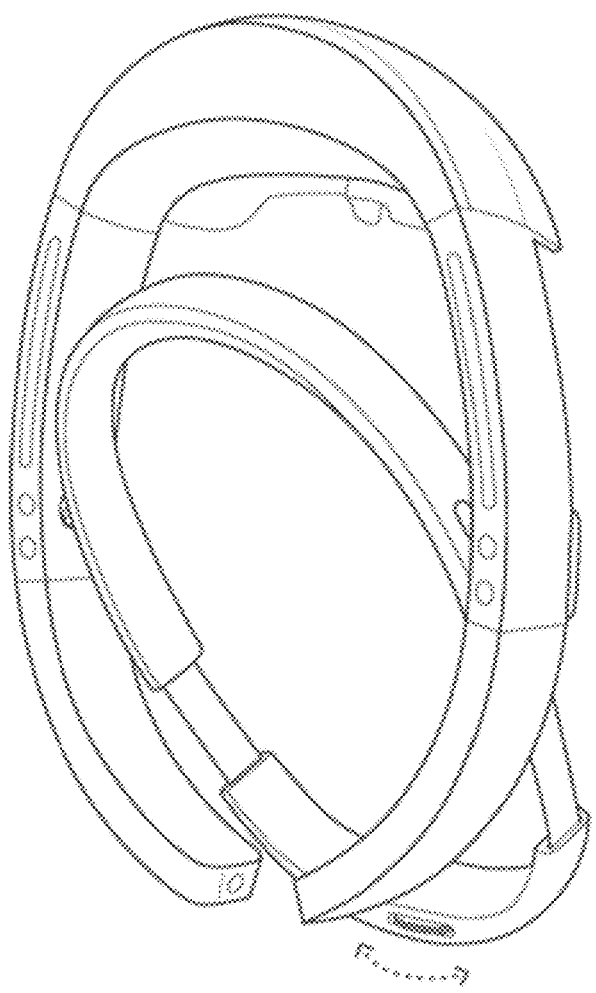
FIG. 1B shows a sketch of HoloLens from Microsoft.
Figure 2A:
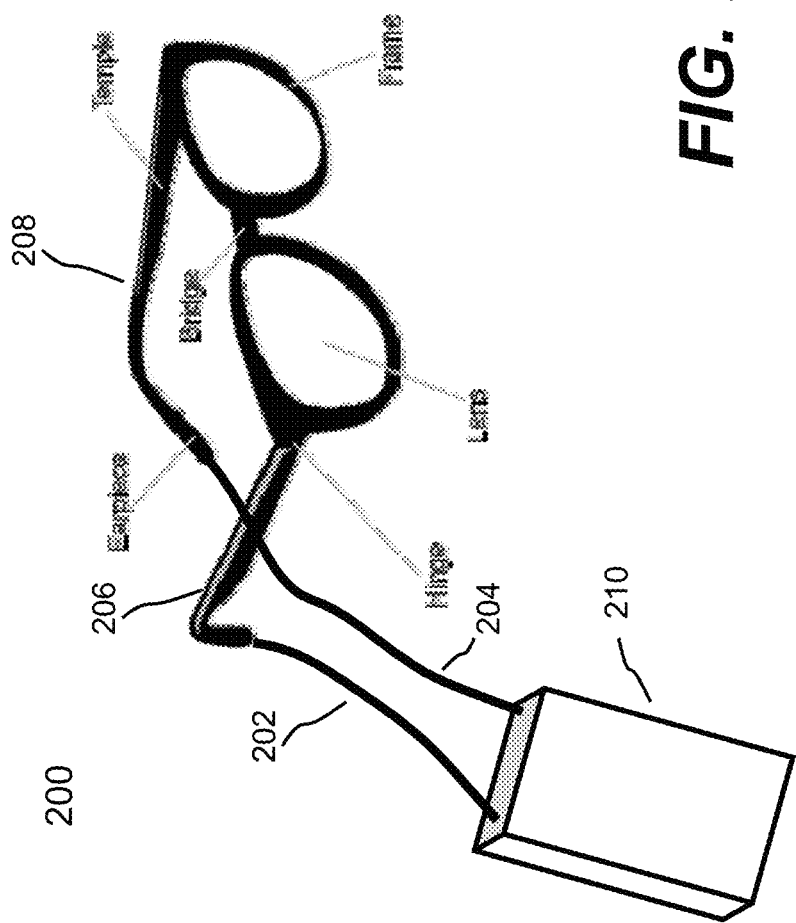
FIG. 2A shows a pair of exemplary glasses that can be used for the application of VR according to one embodiment of the present invention.

Referring now to the drawings, in which like numerals refer to like parts throughout the several views. FIG. 2A shows a pair of exemplary glasses 200 that may be used for applications of VR/AR according to one embodiment of the present invention. The glasses 200 appear no significant difference to a pair of normal glasses but include two flexible cables 202 and 204 that are respectively extended from the temples 206 and 208. According to one embodiment, each pair of the two flexible cables 202 and the temples 206 and 208 are integrated or removably connected at one end thereof and include one or more optical fibers.

Both of the flexible cables 202 are coupled at another end of the temples 206 and 208 to a portable computing device 210, where the computing device 210 generates images based on one or more microdisplays (not shown). The image are displayed on the microdisplays, the resulting optical images of light intensities are captured by the cables 202 via an optical system (e.g., one or more lens). The optical images are transported through optical fiber(s) in the flexible cables 202 by the total internal reflections therein all the way to another end of the optical fiber, where the optical images are then projected onto the lenses in the glasses 200.

Figure 2B:
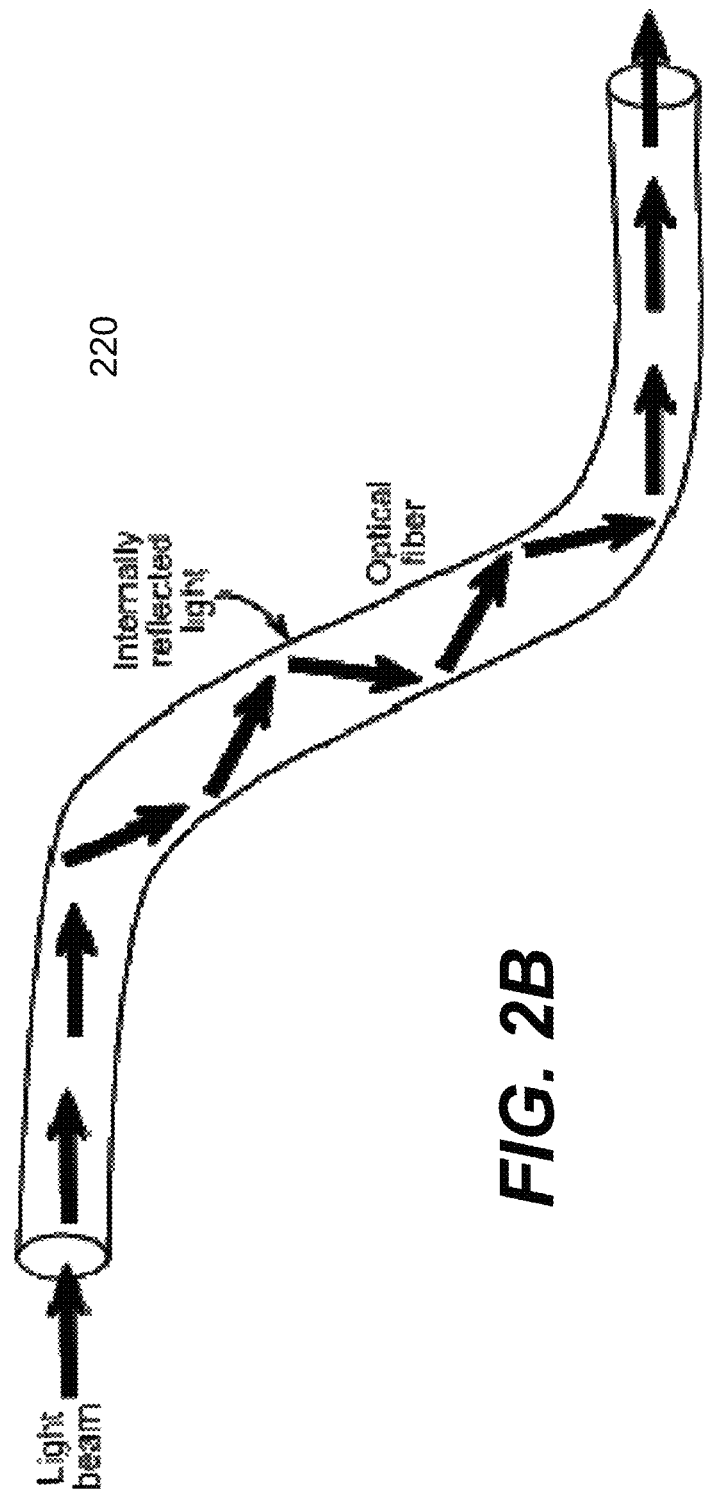
FIG. 2B illustrates that an optical fiber is used to transmit light from one place to the other along curved path in a more effective manner or by total internal reflections within the fiber.

According to one embodiment, each of the two flexible cables 202 includes one or more optical fibers. Optical fibers are used to transmit light from one place to the other along a curved path in a more effective manner as shown in FIG. 2B. In one embodiment, the optical fibers are formed with thousands of strands of a very fine quality glass or quartz of refractive index about 1.7 or so. The thickness of a strand is tine. The strands are coated with a layer of some material of lower refractive index. The ends of the strands are polished and clamped firmly after aligning them carefully. When light is incident at a small angle at one end, it gets refracted into the strands (or fibers) and gets incident on the interface of the fibers and the coating. The angle of incidence being greater than the critical angle, the ray of light undergoes total internal reflections and essentially transports the light from one end to another end even if the fiber is bent. Depending on the implementation of the present invention, a single fiber or a plurality of fibers arranged in parallel may be used to transport an optical image projected onto one end of the fiber or fibers to another end thereof.

Figure 2C:
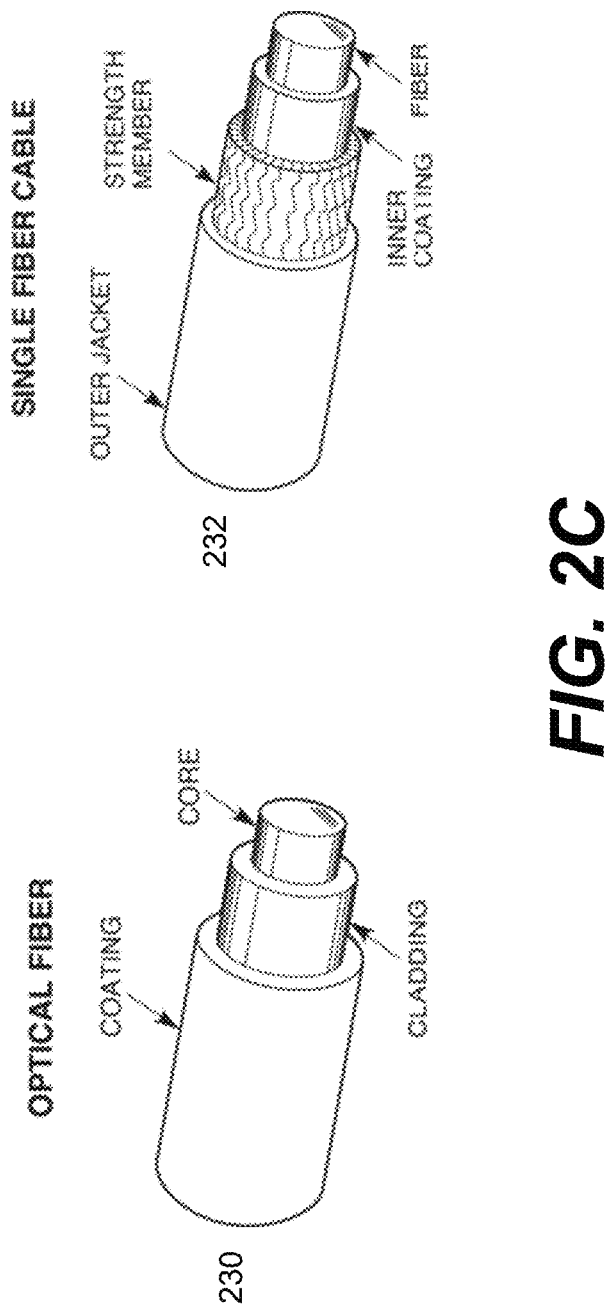
FIG. 2C shows two exemplary ways to encapsulate a fiber or a plurality of fibers according to one embodiment of the present invention.

FIG. 2C shows two exemplary ways to encapsulate a fiber or a plurality of fibers according to one embodiment of the present invention. The encapsulated fiber or fibers may be used as the cable 202 or 204 in FIG. 2A and extended through each of the non-flexible temples 206 and 208 all the way to the end thereof. According to one embodiment, the temples 206 and 208 are made of a type of material (e.g., plastic or metal) commonly seen in a pair of regular glasses, a portion of the cable 202 or 204 is embedded or integrated in the temple 206 or 208, resulting in a non-flexible part while another portion of the cable 202 or 204 remains flexible. According to another embodiment, the non-flexible part and the flexible part of the cable 202 or 204 may be removably connected via a type of interface or connector.

Referring now to FIG. 2D, it shows how an image is being transported from a microdisplay 240 via an optical fiber 242 to an imaging medium 244. As will be further described below, an imaging medium 244 may be a physical thing (e.g., films) or non-physical thing (e.g., the air) depending on how an image is received. A microdisplay is a display that has a very small screen (e.g., less than an inch). This type of tiny electronic display system was introduced commercially in the late 1990s. The most common applications of microdisplays include rear-projection TVs and head-mounted displays. Microdisplays may be reflective or transmissive depending upon the way light is allowed to pass through the display unit. Through a lens 246, an image (not shown) displayed on the microdisplay 240 is picked up by one end of the optical fiber 242 that transports the image to the other end of the optical fiber 242. Another lens 248 is provided to collect the image from the optical fiber 242 and projects it to the imaging medium 244. Depending on the implementation, there are different types of microdisplays and imaging mediums. Some of the embodiments of the microdisplays and imaging mediums will be described in detail below.

FIG. 2E shows a set of exemplary variable focus elements (VFE) 250 to accommodate an adjustment of the projection of an image onto an optical object (e.g., an imaging medium or a prism). To facilitate the description of various embodiments of the present invention, it is assumed that there is a physical image medium. As illustrated in FIG. 2E, an image 252 transported by an optical fiber reaches the end surface 254 of the optical fiber. The image 252 is focused by a set of lenses 256, referred to herein as variable focus elements (VFE), onto an imaging medium 258. The VFE 256 is provided to be adjusted to make sure that the image 252 is precisely focused onto the imaging medium 258. Depending on the implementation, the adjustment of the VFE 256 may be done manually or automatically in accordance with an input (e.g., a measurement obtained from a sensor). According to one embodiment, the adjustment of the VFE 256 is performed automatically in accordance with a feedback signal derived from a sensing signal from a sensor looking at an eye (pupil) of the wearer wearing the glasses 200 of FIG. 2A.

Figure 2F:
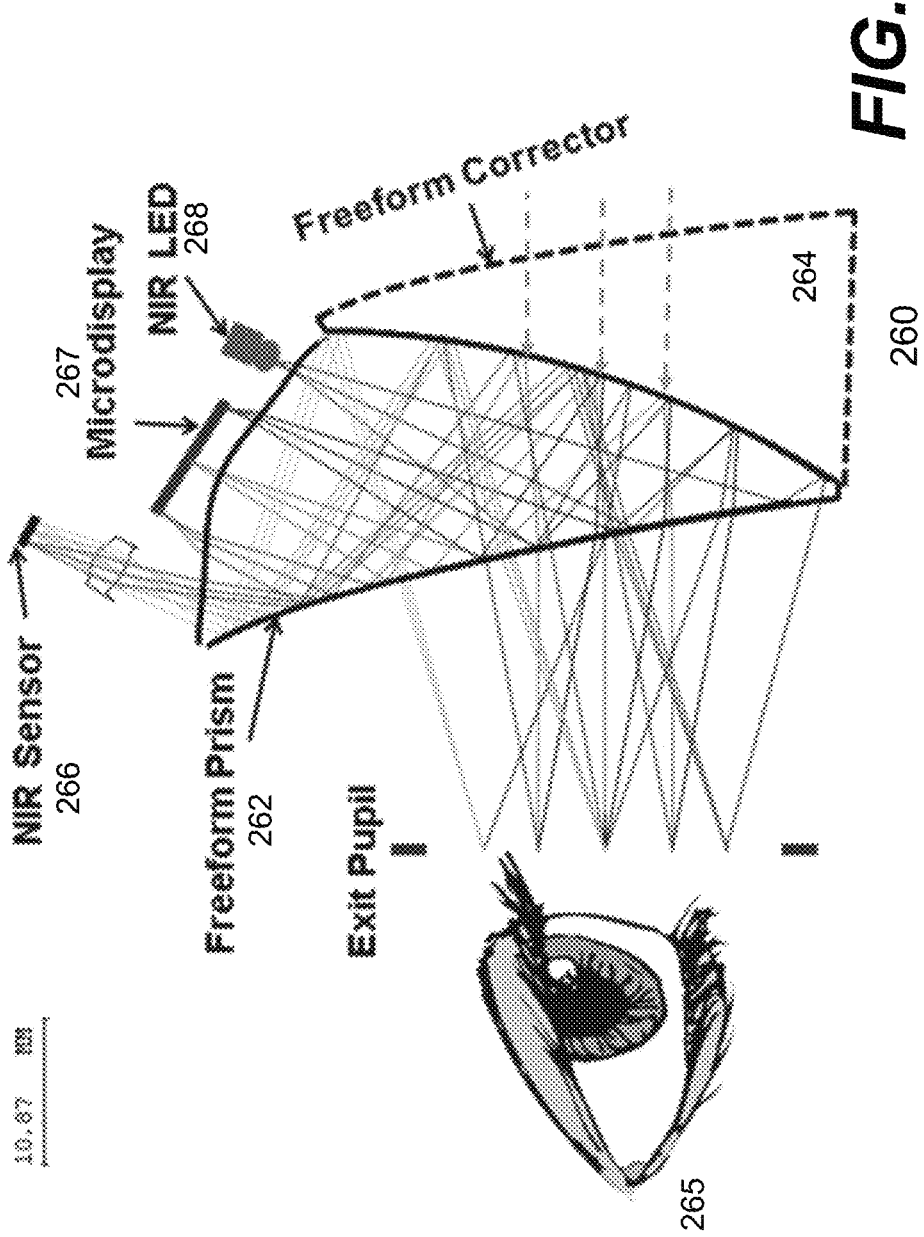
FIG. 2F shows an exemplary lens that may be used in the glasses shown in FIG. 2A, where the lens includes two parts, a prism and an optical correcting lens or corrector.

Referring now to FIG. 2F, it shows an exemplary lens 260 that may be used in the glasses shown in FIG. 2A. The lens 260, also referred to as an integrated lens, includes two parts, a prism 262 and an optical correcting lens or corrector 264. The prism 262 and the corrector 264 are stacked to form the lens 260. As the name suggests, the optical corrector 264 is provided to correct the optical path from the prism 262 so that a light going through the prism 262 goes straight through the corrector 264. In other words, the refracted light from the prism 262 is corrected or de-refracted by the corrector 264. In optics, a prism is a transparent optical element with flat, polished surfaces that refract light. At least two of the flat surfaces must have an angle between them. The exact angles between the surfaces depend on the application. The traditional geometrical shape is that of a triangular prism with a triangular base and rectangular sides, and in colloquial use a prism usually refers to this type. Prisms can be made from any material that is transparent to the wavelengths for which they are designed. Typical materials include glass, plastic and fluorite. According to one embodiment, the type of the prism 262 is not in fact in the shape of geometric prisms, hence the prism 262 is referred herein as a freeform prism, which leads the corrector 264 to a form complementary, reciprocal or conjugate to that of the prism 262 to form the integrated lens 260.

On one edge of the lens 260 or the edge of the prism 262, there are at least three items utilizing the prism 262. Referenced by 267 is an imaging medium providing an image of light intensities. Depending on the implementation, the image transported by the optical fiber 242 of FIG. 2D may be projected directly onto the edge of the prism 262 or formed on the imaging medium 267 before it is projected onto the edge of the prism 262. In any case, the projected image is refracted in the prism 262 and subsequently seen by the eye 265 in accordance with the shapes of the prism 262. In other words, a user wearing a pair of glasses employing the prism 262 can see the image being displayed through or in the prism 262.

A sensor 266 is provided to image the position or movement of the pupil in the eye 265. Again, based on the refractions provided by the prism 262, the location of the pupil can be seen by the sensor 266. In operation, an image of the eye 265 is captured. The image is analyzed to derive how the pupil is looking at the image being shown through or in the lens 260. In the application of AR, the location of the pupil may be used to activate an action. Optionally, a light source 268 is provided to illuminate the eye 265 to facilitate the image capture by the sensor 266. According to one embodiment, the light source 268 uses a near inferred source as such the user or his eye 265 would not be affected by the light source 268 when it is on.

Figure 2G:
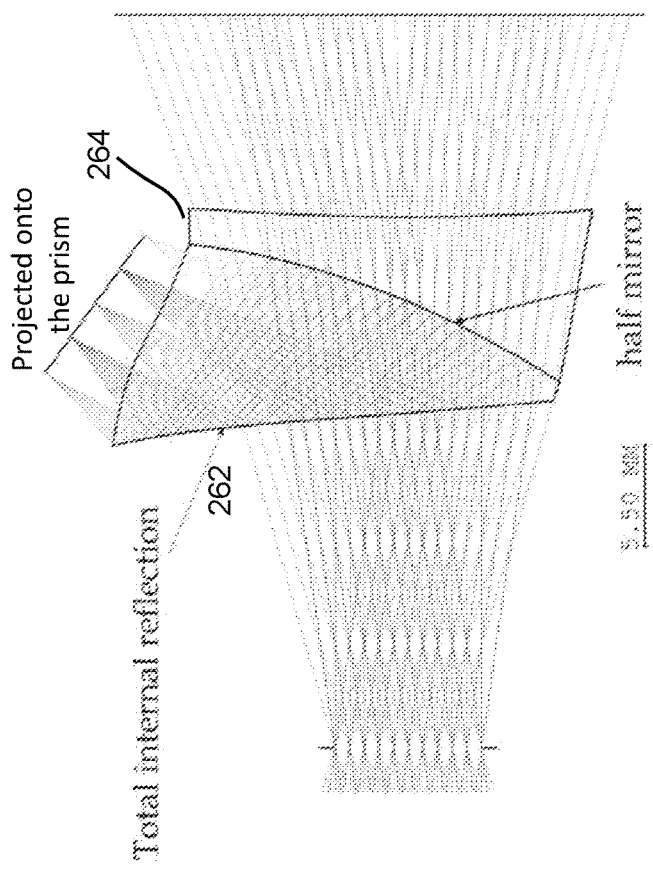
FIG. 2G shows the internal reflections from a plurality of sources (e.g., a sensor, an imaging medium and a plurality of light sources) in an irregular prism.
Figure 2H:
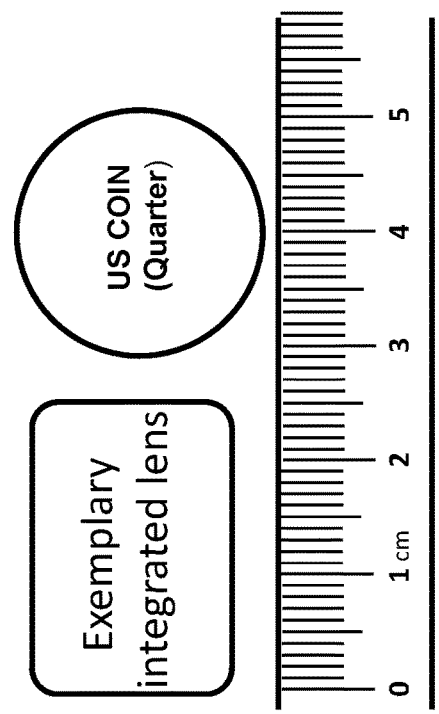
FIG. 2H shows a comparison of such an integrated lens to a coin and a ruler.

FIG. 2G shows the internal reflections from a plurality of sources (e.g., the sensor 266, the imaging medium 267 and the light source 268). As the prism is uniquely designed in particular shapes or to have particular edges, the rays from the sources are reflected several times within the prism 268 and subsequently impinge upon the eye 265. For completeness, FIG. 2H shows a comparison of such a lens to a coin and a ruler in sizes.

As described above, there are different types of microdisplays, hence different imaging mediums. The table below summarizes some of the microdisplays that may be used to facilitate the generation of an optical image that can be transported by one or more optical fibers one end to another end thereof by total internal reflection within the optical fiber(s).

| No. | Microdisplay types | Features | Notes |
|---|---|---|---|
| 1 | LCoS (LCD and OLED) | Full color image displayed on a silicon | A single image |
| 2 | LCoS + LED (RGB sequentially) LCoS + laser (visible, RGB sequentially) LCoS + laser (non-visible) | A single color image displayed at a time | Three images |
| 3 | SLM + laser (RGB sequentially) | A single optical color image | Three optical images |
| 4 | SLM + laser (non-visible) | A single non-visible color image | Need conversion |

LCoS = Liquid crystal on silicon;
LCD = Liquid crystal display;
OLED = Organic light-emitting diode;
RGB = Red, Green and Blue; and
SLM = Spatial light modulation.

In the first case shown above in the table, a full color image is actually displayed on a silicon device (e.g., LCoS). As shown in FIG. 2D, the full color image can be picked up by a focal lens or a set of lenses that project the full image right onto one end of the fiber. The image is transported within the fiber and picked up again by another focal lens at the other end of the fiber. As the transported image is visible and full color, the imaging medium 244 of FIG. 2D may not be physically needed. The color image can be directly projected onto one edge of the prism 262 of FIG. 2F.

In the second case shown above in the table, an LCoS is used with different light sources. In particular, there are at least three colored light sources (e.g., red, green and blue) used sequentially. In other words, a single color image is generated per one light source. The image picked up by the fiber is only a single color image. A full color image can be reproduced when all three different single color images are combined. The imaging medium 244 of FIG. 2D is provided to reproduce the full color image from the three different single color images transported respectively by the optical fiber.

Figure 3A:
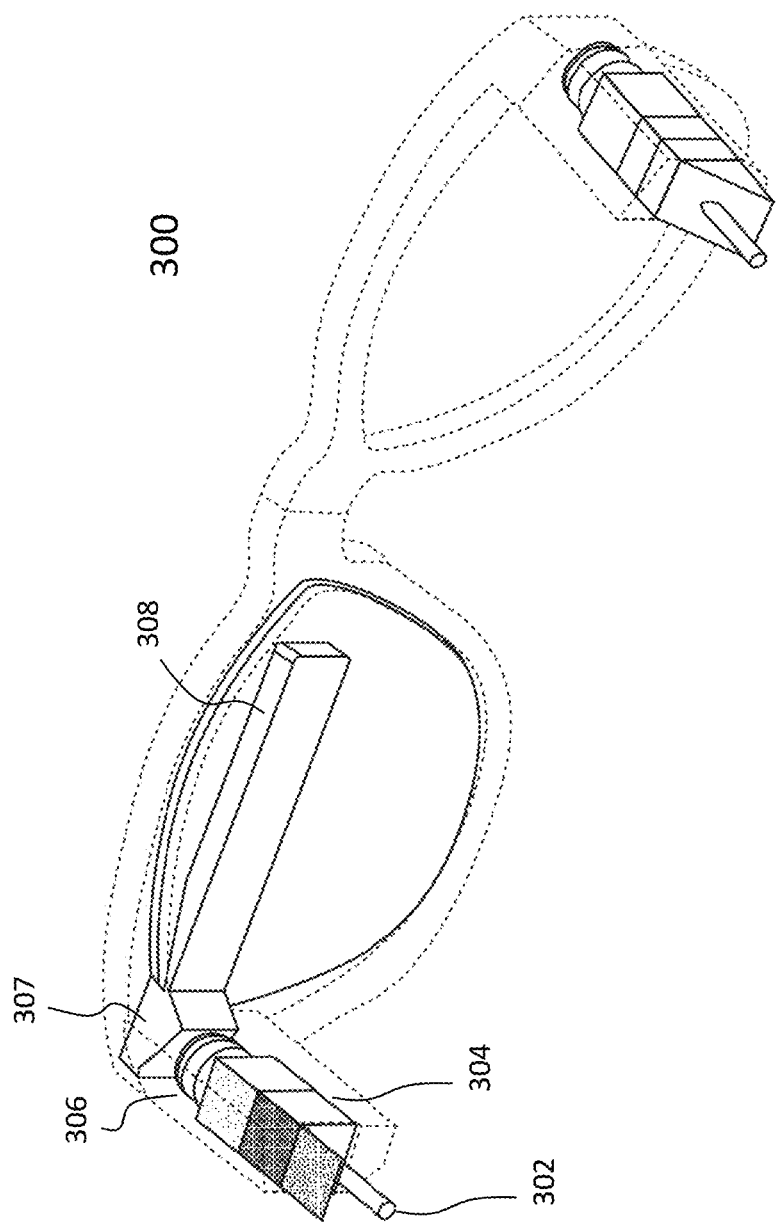
FIG. 3A shows an embodiment of using an active optical cable to send an image source all the way to a microdisplay embedded or integrated in a glasses temple, where a set of lenses or simply a lens is provided to capture the displayed optical image from the microdisplay and focus the image onto the integrated lens of FIG. 2F or a light waveguide.

FIG. 3A shows an embodiment 300 of using an active optical cable 302 to send an image source (data) all the way to a microdisplay 304, where the microdisplay 304 includes one or more display panels. A focusing mechanism or a set of lenses 306, collectively referred to hereafter as a focusing lens, is provided to capture optical images from the displayed images on the panels and focuses the optical images onto the integrated lens 260 of FIG. 2F or a light waveguide or light bar 308. According to one embodiment, the lens 306 is a collimator that collects the optical images and projects collimated light intensities representing the optical images to an optical block or coupler 307 (e.g., a prism, a lens or an optic coupler) that facilitates the propagation of the optical images through the light bar 308.

FIG. 3B shows an example of an active optical cable 320 that includes two ends 321 and 322, and a cable portion 324 having at least one optical fiber and two wires, where the two ends 321 and 322 are coupled by the optical fiber and two wires. The two wires carry power and ground from the first interface 326 to the second interface 328 to energize the two ends 321 and 322 as well as the operation of other components beyond the end of the cable 324 while the at least optical fiber is used to carry all data, control and instruction signals.

Depending on how or how many signals need to go through the cable 324, the number of the fibers may vary or simply just one. The first interface 326 may be implemented as a pluggable (e.g., USB-C type) depending on an actual need while the second interface may also be implemented as a pluggable but in some cases, it is specifically designed to accommodate what is being coupled thereto. Each of the two ends 321 and 322 includes a converter (e.g., a photodiode) to convert an electronic signal to a light or convert a light to an electronic signal. Each of the two ends 321 and 322 further includes necessary integrated circuits to perform encoding or decoding functions if needed, namely a data set or electronic signal when received at the end 321 via the first interface 326 is encoded and presented in a colored light or a set of colored lights. The lights are then transported through the optical fiber in the cable 324 from the end 321 to the end 322 or vice versa. When received at the end 322, the lights are decoded to recover the electronic signals. The details of the end 321 or 322 are not to be further provided herein to avoid obscuring other aspects of the present invention.

It is assumed that the cable 320 is used to transport a set of signals from the end 321 to the end 322 or vice versa. One, two or three of the signals are related to the three components of a color image or video, for example, red (R), green (G) and blue (B), another one or more of the signals are related to an instruction how to interface with a displayed image, for example, activating an object in a left corner of the displayed image, navigating along a path in the image and starting to count the time an object is being stared at. Still there are various control signals, such as clock signals, controls to other components, such as the light source 268 and the sensor 266 of FIG. 2F which are also powered by the power provided in the cable 320.

According to one embodiment, the converter in the end 321 converts the signals to a light beam including a set of optical signals, where each of the optical signal is encoded (e.g., in different colors) per one of the signals. Alternatively, a set of beams is produced by the converter, each beam corresponds to one of the signals. A light beam is then transported within a fiber from the first end 321 to the second end 322 or vice verse. Once reaching the second end 322, a converter therein converts the light beam back into one or more electronic signals. It can be appreciated by those skilled in the art that the cable 320 is much lighter than a wire-based cable that would be otherwise used to carry these signals. It can also be readily understood that the active optical cable may include additional metal wires or more optical fibers to transmit data, control signals or various instructions needed to present appropriate images/videos to a viewer.

FIG. 3C.1 shows an example of a temple 330 that may be used in the display glasses described in the present invention. Whatever the material the temple 330 may use, it encapsulates or is integrated with a portion 332 of an active optical cable (e.g., a section of the cable 320). As indicated about, the optical fibers in the cable 320 are flexible, so are the few wires, the entire cable 320 is flexible. Accordingly, the portion 332 of the active optical may be structured per a predefined shape of the temple 330 and even curved or rotated if needed. In summary, the temple 330 is designed as a communication medium for transporting the power, data, control signals and instructions back and forth while keeping extremely light weighted.

FIG. 3C.1 also shows that there is an optical image fixture 334 provided to generate one or more optical images of light intensities corresponding to images displayed on a microdisplay corresponding to the microdisplay 304 of FIG. 3A. FIG. 3C.2 shows an exemplary implementation of such an optical image fixture, engine or generator 334 that includes a microdisplay 336, a focusing mechanism 337 (e.g., a collimator) and an optical coupler 338. As the name suggests, the optical image generator 334 is designed to generate optical images used to reproduce a color image from the optical image, where the color image is viewed in an integrated lens or a glass bar. Depending on the implementation, the microdisplay 336, including one or more display panels, is coupled to the cable 332 or the portion 332 of the active optical cable to receive the power, data, control signals and instructions.

Figure 3D:
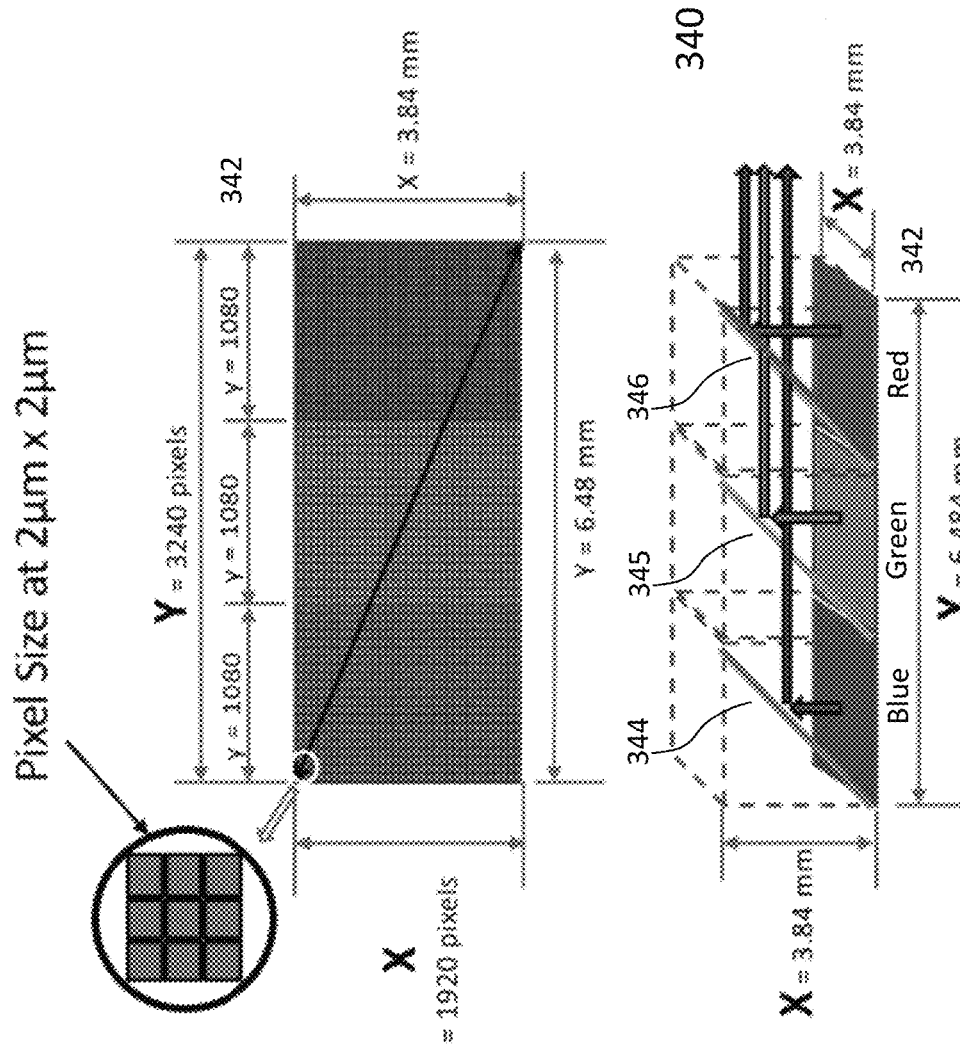
FIG. 3D shows an example of a microdisplay according to one embodiment of the present invention.

Referring now to FIG. 3D, it shows an example 340 of the microdisplay 334 according to one embodiment of the present invention. The microdisplay 340 includes three colored display panels 342, typically in red (R), green (G) and blue (B), to display a colored image. As used herein, a colored image is a monochromatic image of single color. The combination of three monochromatic images in red, green and blue reproduce the full colors in a color image. Significantly different from the traditional microdisplay, such as a single LCoS, the microdisplay 340 uses the three colored display panels (red, green and blue) 342, side by side or in parallel, to show three individual colored images. It is assumed that the active optical cable 332 provides data related to three individual colored images in red, green and blue. Each of the data sets for a color is used to drive one of the three colored display panels 342.

Depending on an implementation, the panels 342 may be implemented in µOLED or µLED or any self-illuminated devices. Given the proper data, control signals and power, the panels 340 can be lighted in accordance with the respective data sets. The details of the circuitry including the memory designs to drive these panels 342 are ignored to avoid obscuring other aspects of the present invention. FIG. 3D also shows that there are three reflectors or mirrors 344-346 positioned diagonally and respectively above the three panels 342 to turn all the reflects lights (three colored optical images) into one direction. Specifically, the mirror 344 for blue is positioned at 45 degrees above the panel for blue image. As a result, the mirror 344 turns the lights from the blue image towards the green and red panels. The mirror 345 for green is positioned at 45 degrees above the panel for green image, but the mirror 345 is specially coated and reflects only the green lights. In other words, the blues lights from the mirror 344 can pass through the mirror 345, which allows the blue lights to be mixed with the green lights. Similarly, the mirror 346 for red is positioned at 45 degrees above the panel for red image, but the mirror 346 is specially coated and reflects only the red lights. In other words, the blue light, the green light or the mixed blue and green lights can pass through the mirror 346, which allows the red lights to be mixed further with the already mixed blue and green lights. Pixels are in these three optical images are precisely registered. Now with the available three individual lights or mixed red, green and blue lights, an optical color image is formed. In other words, the microdisplay 304,334, or 340 including these panels 342 provides a full color optical image or video that is then focused onto the light guide 308 via the lens 306 of FIG. 3A. It should be noted that the reproduction of a full color image can also be achieved by the successive arrival of the three individual colored optical images in a human vision.

One of the advantages, benefits and objects in using three parallel self-illuminated panels is the significant reduction in costs of manufacturing these panels. Instead of arranging colored sources interlaced (e.g., RGBRGBRGB), the three parallel self-illuminated panels won't not require any interlacing structure. As shown in FIG. 3D, a whole panel could be made without the interlacing structure. In other words, a colored filter may be uniformly applied across an array of display elements (pixels). When OLED materials are used, the colored segments or pigments can easily be deposited without high resolution lithography for pixelization, resulting in small and high resolution OLED panels that produce efficient and brighter emission via tandem structure and micro-cavity technology. The full colors are achieved via optics by merging the three colored lights from the three different panels. Overall, the microdisplay can be made very compact with sufficient intensity in near-eye displays.

Figure 3E:
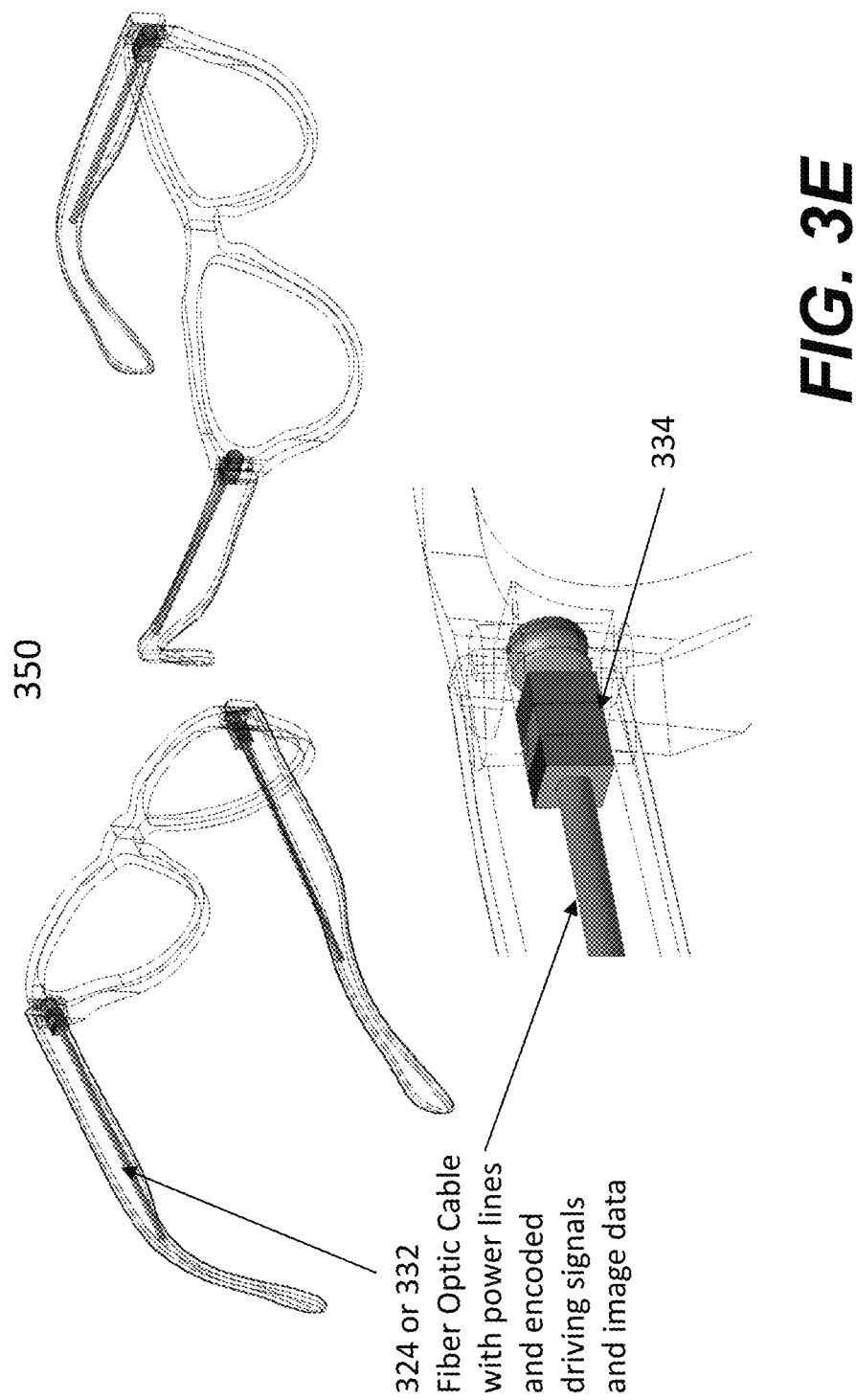
FIG. 3E shows a set of perspectives of how an active optical cable is extended to a microdisplay, where an optical image from the microdisplay is further projected onto an integrated lens in a glasses lens.

As an example, FIG. 3D also shows the dimensions of these panels 334 to show the physical size of the microdisplay to project a high resolution image. FIG. 3E shows a set of perspectives 350 of how an active optical cable is extended to a microdisplay, where an optical image from the microdisplay is further projected onto an integrated lens of a glasses lens.

Figure 3F:
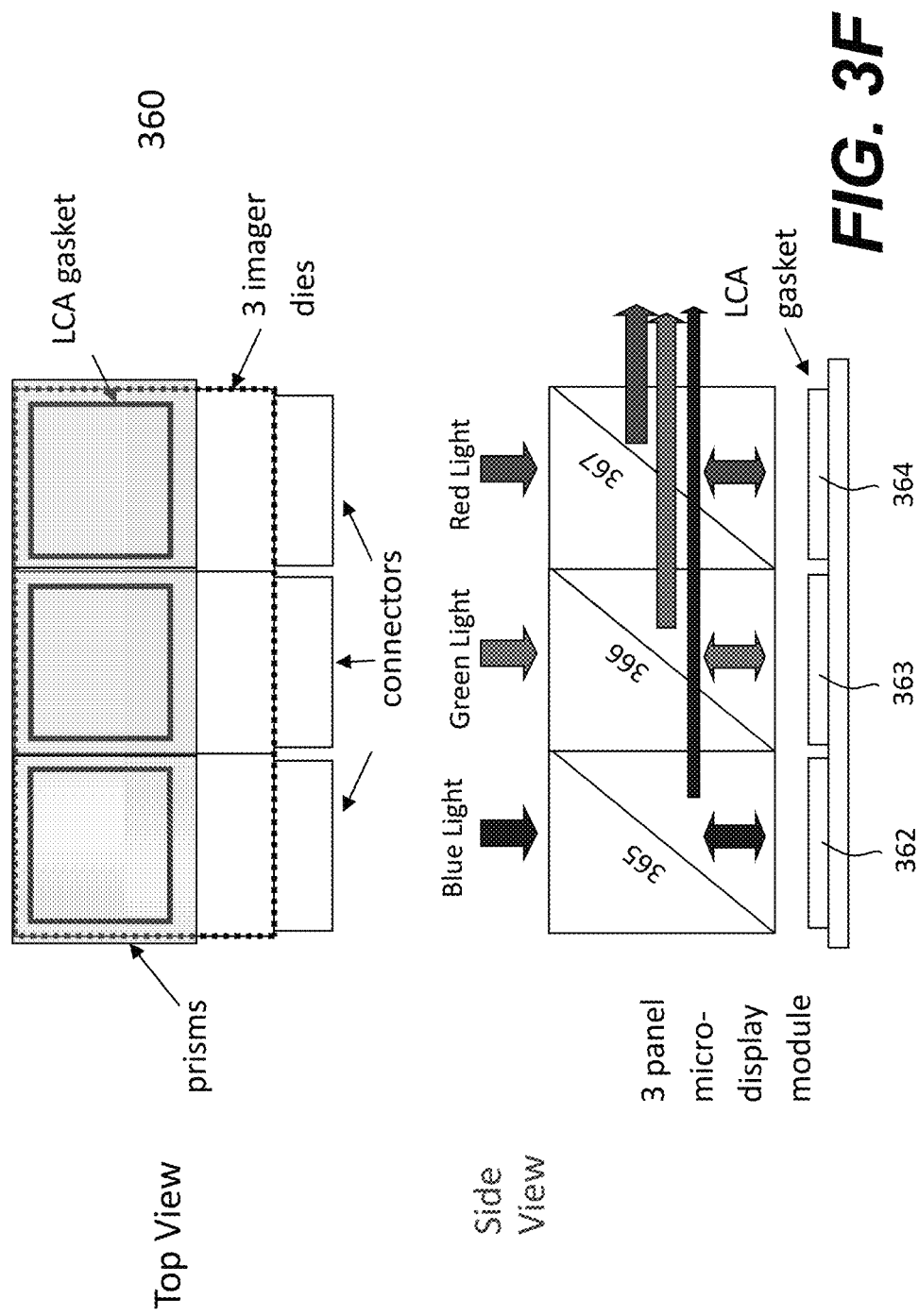
FIG. 3F shows an embodiment of using panels that are not self-illuminated devices (e.g., LCoS or LCD)

FIG. 3F shows an embodiment of using panels that are not self-illuminated devices. An example of such panels is liquid crystal on silicon (LCoS or LCOS), a miniaturized reflective active-matrix liquid-crystal display using a liquid crystal layer on top of a silicon backplane. It is also referred to as a spatial light modulator. As the name suggests, it requires an external light to shine the panel to be modulated with the content being displayed. The reflected light (modulated) can be captured for display. FIG. 3F shows that there are three colored LCOS panels 362-364, respectively for red, green and blue. That means each of the panels 362-364 is specifically designated for showing a colored image, e.g., a red image, a green image and a blue image. Three independent external lights, Light Source 1, Light Source 2 and Light Source 3 are provided to shine the panels 362-364, respectively. The reflected light from each of the panels 362-364 hits a reflector or deflector. According to one embodiment, a polarized beam splitter (PBS) cube may also be used to deflect a colored light.

Structurally, the mirror 365 for blue is positioned at 45 degrees above the panel 362 for blue image. As a result, the mirror 365 turns the reflected light from the panel 362 towards the green and red panels. The mirror 366 for green is positioned at 45 degrees above the panel 363 for green image, but the mirror 366 is specially coated and reflects only the green light. In other words, the blue light from the mirror 365 can pass through the mirror 366, which allows the blue light to be mixed with the green light. Similarly, the mirror 367 for red is positioned at 45 degrees above the panel 364 for red image, but the mirror 367 is specially coated and reflects only the red light. In other words, the mixed blue and green lights can pass through the mirror 367, which allows the red light to be mixed further with the already mixed blue and green lights. Now with the mixed red, green and blue lights, an optical color image is formed. In one embodiment, the arrangement of farmost blue, then to green and thereafter nearest red with respect to a focusing lens is specially designed due to the consideration of the wavelength of B, G and R with different diffractive index travelling distance of the optical path incident to the waveguide 308. In the end, the microdisplay 304 or 334 including these panels 362-364 along with the external lights can eventually reproduce a full color image or video that is then focused onto the light guide 308 via the lens 306 of FIG. 3A.

It is known that packing three primary color pixels (typically R-G-B) within a regular matrix produces asymmetrical angular resolution for images of different colors. Insufficient pixel density and asymmetrical angular resolution manifest themselves as image coarseness and color fringing or aliasing. Coarseness and/or asymmetry of R and G primaries are particularly problematic, especially for the mixture colors yellow (R+G) and white (R+G+B). The problem arises due to the high degree of resolution acuity for R and G in human visual system. This makes the fusion of R and G primary elements difficult at practical levels of discrete element pixel density.

Figure 3G:
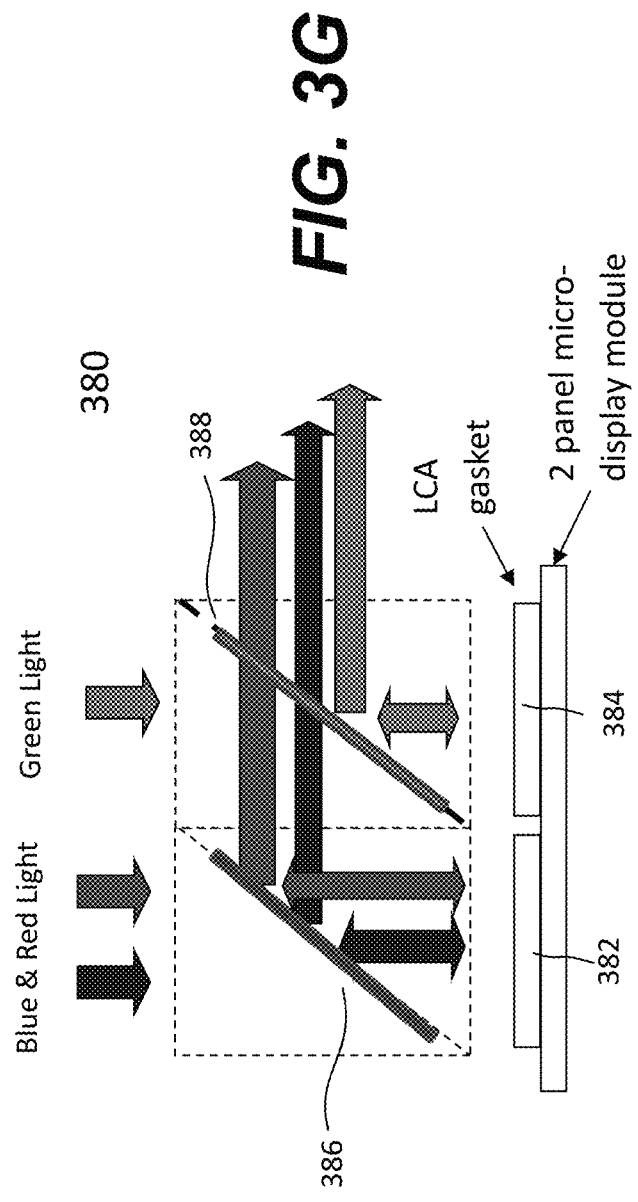
FIG. 3G shows an example of using two panels to realize a four color repetitive sequence.

A common solution is to use four color repetitive sequence matrix arrays by establishing a repetitive sequence with pixels of four different colors arranged in the rows of the matrix. The sequence commences with a different color in each row, thereby establishing a second repetitive sequence in the matrix columns. These row and column sequences establish a pattern of 16 pixels with sets of four rows and four columns that is repetitive throughout the array. FIG. 3G shows an example 380 of using two panels to realize such a four color repetitive sequence. There are two panels 382 and 384, one panel is for color sequential between red and blue, the other panel 384 is for green, where the green is lit twice when the panel 382 is switched from red to blue or blue to red. It is assumed that an optical lens (such as the lens 306 of FIG. 3A) is on the right.

In operation, the panel 382 is provided with image data for a first color (e.g., blue) and illuminated by a first colored light source (e.g., blue LED light). The first optical image from the display on the panel 382 is deflected by a deflector or mirror 386 to the right, passing through another mirror 388, where the mirror 388 is optically coated with a film that allows the passing of red or blue. In the meantime or soon after, the panel 384 is provided with image data for a green color and illuminated by a green light source. The green optical image from the display on the panel 384 is deflected by the mirror 388 to the right, going to the optical lens or merging with the first optical image before reaching the optical lens. The mirror 388 is optically coated with a type of material (e.g., films) that allows the passing of red or blue or all colors except for green. Next the panel 382 is provided with image data for a second color (e.g., red) and illuminated by a second colored light source (e.g., red LED light), the second optical image from the display on the panel 382 is deflected by the mirror 386 to the right, passing through the mirror 388. In the meantime or soon after, the panel 384 is caused to display the same image data again for a green color and illuminated by the green light source. The green optical image from the display on the panel 388 is deflected by the mirror 388 to the right. In other words, the panel 382 is used to provide two of the three sequential colors (i.e., red and blue) while the panel 384 provides the green color twice, each right after one of the sequential colors by the panel 382. The deflected lights (four colored optical images) may be merged optically or to be merged in human visions.

Figure 3H:
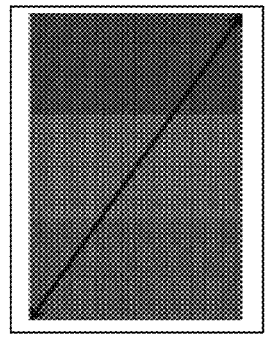
FIG. 3H shows what is referred to herein a top-emitting configuration, an alternative design using the self-aligned single-chip 3-segment μOLED.
Figure 3H:
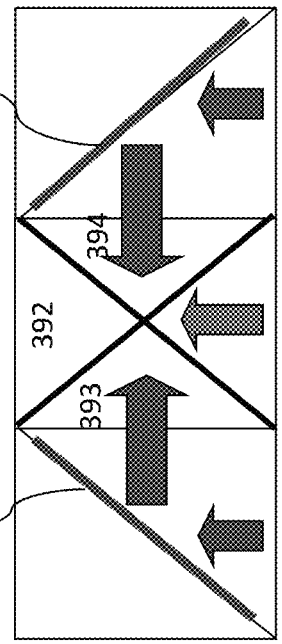
Figure 3H:
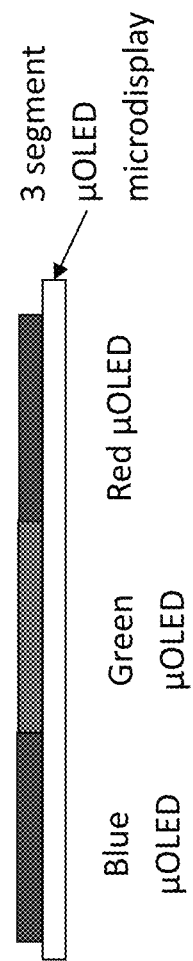

FIG. 3H shows what is referred to herein a top-emitting configuration 390, an alternative design using the self-aligned single-chip 3-segment μOLED. In view of the side-emitting configuration 360, the mirror 366 is replaced with a cube 392 including two mirrors 393 and 394. A deflected blue light from the blue panel passes through the mirror 393 and is deflected upwards by a coating on the mirror 393. Similarly, a deflected red light from the red panel passes through the mirror 394 and is deflected upwards by a coating on the mirror 394. The coatings on both of the mirrors 393-394 allow the green light to pass through. As a result, the three colored optical images are all emitted towards top.

In a preferred embodiment, the panels in FIG. 3D or FIG. 3H are OLED-based micro displays. OLEDs are solid-state devices composed of thin films of organic molecules that create light with the application of electricity. OLEDs can provide brighter, crisper displays on electronic devices and use less power than conventional light-emitting diodes (LEDs) or liquid crystal displays (LCDs) used today. FIG. 4A.1 shows two types of μOLED display pixel structure, individual RGB elements and white OLED as background. In either one of the cases, there is a process of separating three individually colored elements (pixels), which is a costly procedure in manufacturing OLED display panels. FIG. 4A.2 shows the traditional or typical pixilation of a μOLED or μLED display panel with sophisticated manufacturing process based on precision masks to form the pixel array with red, green and blue pixel interlacing configuration. However, this procedure could be eliminated with the implementation of FIG. 3D or FIG. 3H.

Figure 4B:
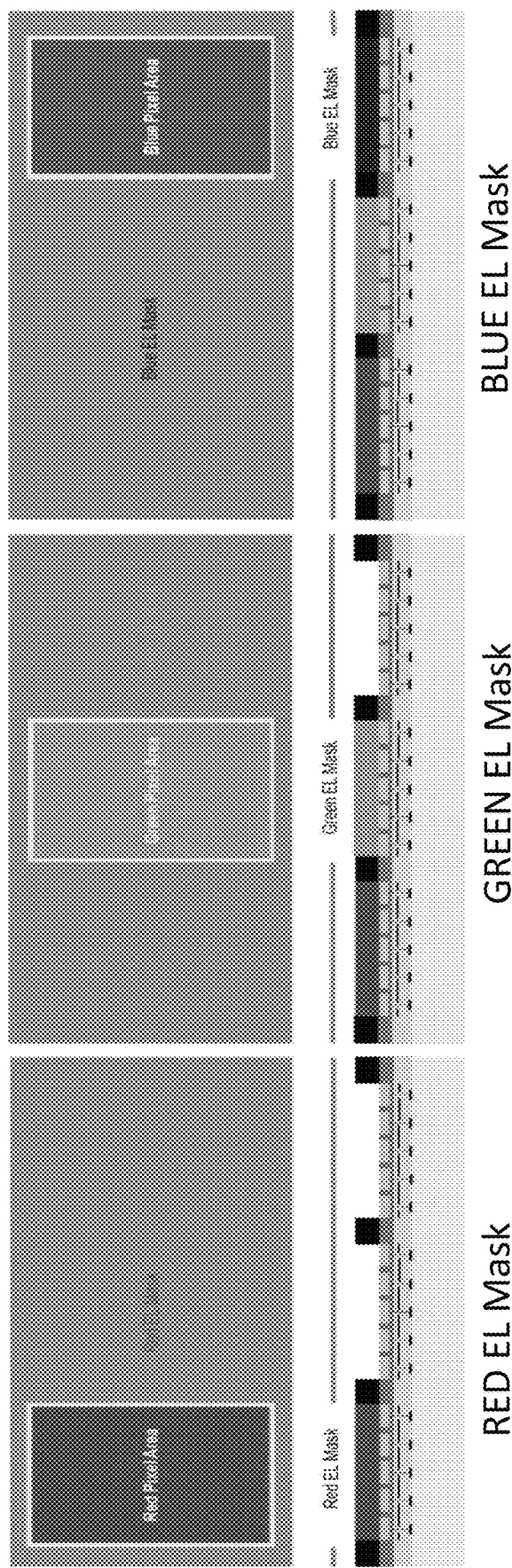
FIG. 4B shows an example of pixels uniformly colored across an entire display panel.

According to one embodiment as shown in FIG. 4B, pixels are uniformly colored across an entire display panel. In other words, an array of OLED pixels are all deposed for one color, and there are three arrays, each for one color. In addition, the arrays may come perfectly aligned as they may be all from one substrate. As a result, the display panels in a microdisplay are self-aligned (array-to-array and/or panel-to-panel aligned) and further pixel-to-pixel registered via the deflectors. FIG. 4B shows that a particular (colored) mask is used for an entire array of elements, thus there is no need to use a fine mask with individual elements colored differently. According to one embodiment, an array of pixels is uniformly deposed with a color filter. After three arrays are respectively done for a designed color, they can be integrated as shown in FIG. 4C. FIG. 4D shows some details of three OLED-based panels in a microdisplay used to produce a full color optical image to be displayed in a pair of display glasses according to one embodiment of the present invention. As indicated in FIG. 4D, the total size of the three panels is measured 3.84 mm×3.84 mm×6.48 mm cuboid to display a resolution of 1920×1080 pixels array of microdisplay panel used in a pair of display glasses according to one embodiment of the present invention. For example, based on one embodiment of the present invention with method applied, if a pixel size at 2 μm×2 μm for each B, G and R color array is chosen, the accumulated equivalent pixel characteristic is 6 μm (=2 μm×3); if pixel size at 3 μm×3 μm for each B, G and R color array is chosen, the accumulated equivalent pixel characteristic is 9 μm (=3 μm×3). However, overall microdisplay OE module 304, 334 or 340 is formed as cuboid shape compared with traditional panel size is significantly reduced each dimensions to meet the ultra light-weight and small size of the see-through display glasses requirement on AR (Augmented Reality) and VR (Virtual Reality) glasses applications.

Figure 5A:
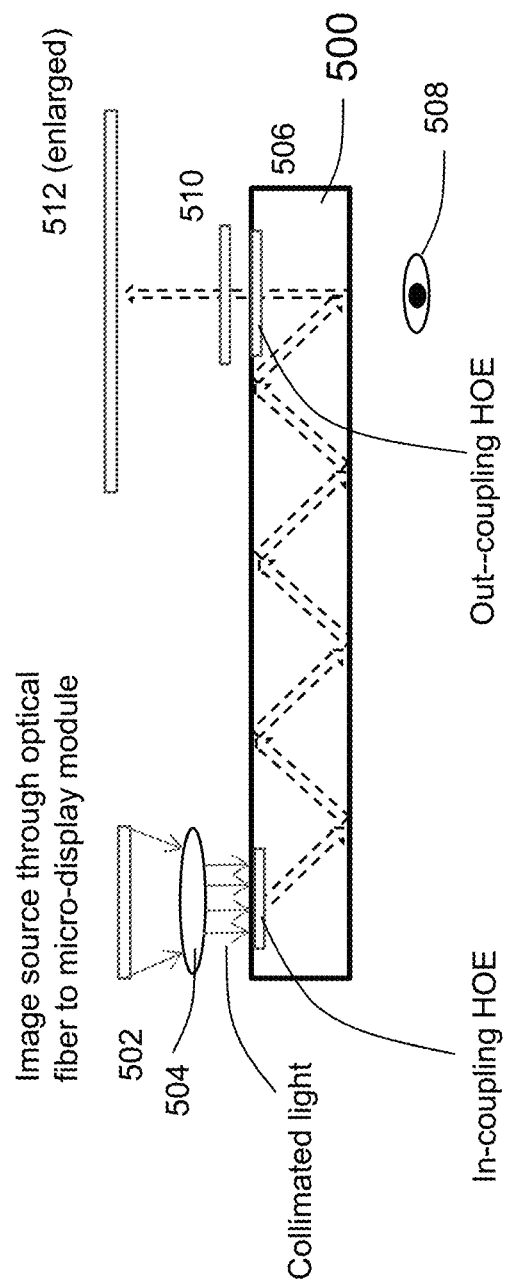
FIG. 5A shows that a waveguide is used to transport optical images or an optical image from a lens to another end of the waveguide.

Referring now to FIG. 5A, it shows that a waveguide 500 is used to transport optical images or an optical image 502 from a lens 504 to another end 506 thereof. As described above, one or more microdisplays are used to generate one or more optical images that are collected by the 306 as shown in FIG. 3A. The lens 504 (e.g., a collimator) corresponding to the lens 306 projects the image 502 into the waveguide 500. Depending on implementation, the waveguide 500 may be a stack of one or more pieces of highly transparent materials with different optical characteristics or glasses coated with one or more films to form a suitable transparent bar 308 for displaying images/videos from a computing device. It is known to those skilled in the art that an optical waveguide is a spatially inhomogeneous structure for guiding light, i.e. for restricting the spatial region in which light can propagate, where a waveguide contains a region of increased refractive index, compared with the surrounding medium (often called cladding).

The waveguide 500 is transparent and shaped appropriately at the end of 500 to allow the image 502 to be propagated along the waveguide 500 to the end 506, where a user 508 can see through the waveguide 500 so as to see the propagated image 510 therein. According to one embodiment, one or more films are disposed upon the waveguide 500 to amplify the propagated image 510 so that the eye 508 can see a significantly amplified image 512. One example of such films is what is called metalenses, essentially an array of thin titanium dioxide nanofins on a glass substrate.

According to one embodiment, FIG. 5B.1 shows a ray trace of the projected optical images or a color optical image from an optical block 510 integrated with a light incident light coupling HOE (Holographic Optical Element) 511. As the colors in the optical images are different in wavelengths, they are projected into the waveguide 512 in different angles and thus travel across the waveguide 512 in their own paths by total internal reflections within the waveguide 512. FIG. 5B.2 shows a corresponding top view of the waveguide 512 according to one embodiment of the present invention. The top view of the waveguide 512 shows an example of an integrated lens embedding the waveguide 512 in a piece of lens.

FIG. 5C.1 shows another embodiment of a waveguide 515 with a ray trace of the projected optical images or a color optical image. Comparing FIG. 5C.1 to FIG. 5B.1, the optical block 510 is omitted, where a coupler 516 is deposed right onto the waveguide 515. The optical characteristics of the coupler 516 is modified or the collimated lights enter the waveguide 515 in different angles. In any case, the colored rays representing the optical images are properly projected or coupled into the waveguide 515, traveling across the waveguide 515 in their own paths by total internal reflections within the waveguide 515. In one embodiment, the coupler 516 is a light incident light coupling HOE 516. FIG. 5C.2 shows a corresponding top view of the waveguide 515 according to one embodiment of the present invention. The top view of the waveguide 515 again shows an example of an integrated lens embedding the waveguide 515 in a piece of lens.

Figure 5D:
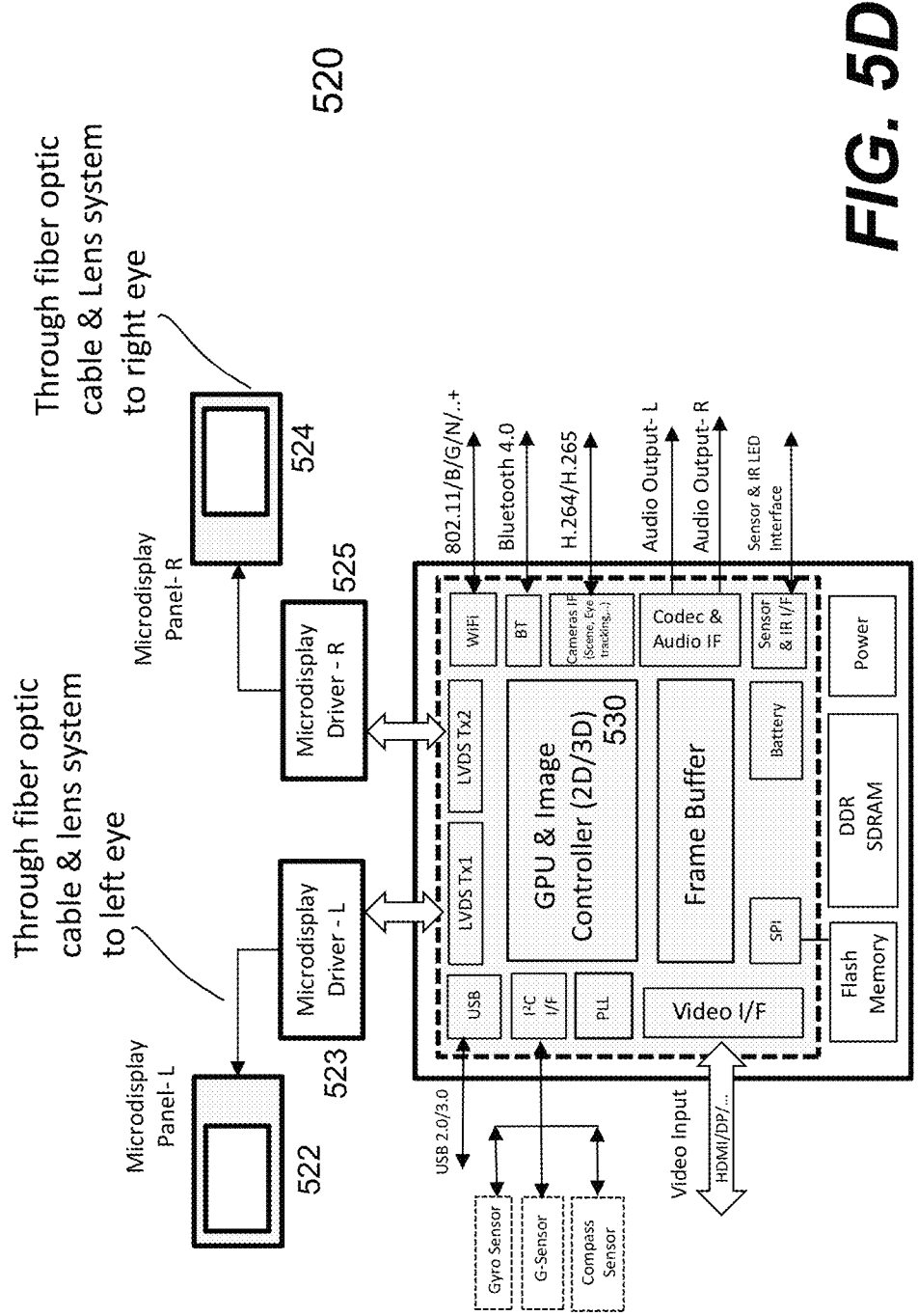
FIG. 5D shows an exemplary functional block diagram that may be used in a separate case or enclosure to produce image or video content (e.g., related to virtual reality and augmented reality) for display on the exemplary glasses of FIG. 3A or FIG. 3E.

Referring now to FIG. 5D, it shows an exemplary functional block diagram 520 that may be used in a separate case or enclosure to produce image or video content (e.g., related to virtual reality and augmented reality) for display on the exemplary glasses of FIG. 3A. As shown in FIG. 5D, there are two microdisplays 522 and 524 provided to supply content to both of the lenses in the glasses of FIG. 2A, essentially a left image goes to the left lens and a right image goes to the right lens. An example of the content is 2D or 3D images and video, or hologram. Each of the microdisplays 522 and 524 is driven by a corresponding driver 523 or 525 via an active optical cable (e.g., the cable 302 of FIG. 3A).

Each of the microdisplays 522 and 524 includes one or more display panels that may correspond to the examples shown in FIGS. 3D, 3F-3H. Each of the microdisplays 522 and 524 may be disposed near the end of an temple as shown in FIG. 3A. The optical image(s) is picked up by the lens 306 that further projects the image(s) into the optical bar 308. As a result, a viewer of the display glasses 300 can view the optical image through the bar 308, where the right part is ignored.

The entire circuit 520 is controlled and driven by a controller 530 that is programmed to generate the content. According to one embodiment, the circuit 520 is designed to communicate with the Internet (not shown), receive the content from other devices. In particular, the circuit 520 includes an interface to receive a sensing signal from a remote sensor (e.g., the sensor 266 of FIG. 2F) via a wireless means (e.g., RF or Bluetooth) or via an active optical fiber. The controller 530 is programmed to analyze the sensing signal and provides a feedback signal to control certain operations of the glasses, such as the lens 306 or projection mechanism that includes a focal mechanism auto-focusing and projecting the optical image onto an edge of the prism 262 of FIG. 2F. In addition, the audio is provided to synchronize with the content, and may be transmitted to earphones wirelessly.

FIG. 5D shows an exemplary circuit 520 to produce the content for display in a pair of glasses contemplated in one embodiment of the present invention. The circuit 500 shows that there are two microdisplays 522 and 524 used to provide two respective images or video streams to the two lenses of the glasses in FIG. 2A. The image or video data is transported via two respective active optical cable directly to the microdisplays 522 and 524, each is embedded in a temple. The two microdisplays 522 and 524 can provide stereo, 3D images as well as surrounding images, when displayed in two integrated lens in a pair of display glasses.

The present invention has been described in sufficient detail with a certain degree of particularity. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the forgoing description of embodiments.

I claim:

1. A display apparatus for displaying a color image, the display apparatus comprising:

a lens;

a temple with a first end and a second end;

a focusing mechanism;

an optical image generator including a microdisplay including a plurality of display panels disposed at the first end of the temple and a plurality of mirrors, each of the mirrors disposed diagonally above one of the display panels, wherein the display panels are laid in parallel to each other on a substrate, the display panels display a plurality of monochromatic images with identical content, the monochromatic images are in different colors, captured and turned respectively by the mirrors towards the focusing mechanism; and a light waveguide, integrated onto the lens;

wherein the focusing mechanism, disposed between the optical image generator and the light waveguide, capturing a combined optical image from the colored images via the mirrors and projecting the combined optical image into the light waveguide, wherein the combined optical image is seen through the light waveguide as a perceived color image by a user.

2. The display apparatus as recited in claim 1, wherein a first monochromatic image from one of the display panels is reflected by a first mirror thereabove towards a second mirror above a next one of the display panels, the first monochromatic image going through the second mirror is merged with a second monochromatic image reflected by the second mirror, the merged first and second monochromatic images going through a third mirror is merged again with a third monochromatic image reflected by the third mirror above another one of the display panels, and wherein the combined optical image is a combination of the first, second and third monochromatic images.

3. The display apparatus as recited in claim 2, wherein the temple includes an active optical cable entering the temple from the second end and extending to the microdisplay, the active optical cable including at least two wires to energize the optical image generator and one optical fiber transmitting image data and control signals.

4. The display apparatus as recited in claim 3, wherein the image data and control signals are provided from an enclosure wearable by the user, the active optical cable couples the display apparatus to the enclosure to receive the image data and control signals therefrom.

5. The display apparatus as recited in claim 3, wherein the display panels receive the image data and operate per the control signals from the active optical cable.

6. The display apparatus as recited in claim 5, wherein each of the mirrors is coated with a type of reflective material and deflects each of the colored images from the each of the display panels towards the focusing mechanism.

7. The display apparatus as recited in claim 6, wherein the focusing mechanism includes a collimator provided to collimate the combined optical image and project the collimated optical image into the light waveguide.

8. The display apparatus as recited in claim 6, wherein the focusing mechanism is disposed at one side of the display panels, captures the colored images respectively from the display panels and projects the combined optical images into the light waveguide.

9. The display apparatus as recited in claim 5, wherein the display panels are self-illuminated, each of the display panels displays one colored image.

10. The display apparatus as recited in claim 9, wherein the perceived color image is a result of combining the colored images collectively from the display panels.

11. The display apparatus as recited in claim 10, wherein each of the display panels is based on μLED or μOLED.

12. The display apparatus as recited in claim 5, wherein the display panels are non self-illuminated, the microdisplay further includes a set of colored light sources, each for one of the display panels, the colored light sources is turned successively to illuminate a corresponding one of the display panels and produces a colored optical image.

13. The display apparatus as recited in claim 12, wherein each of the display panels is a LCD or LCoS.

* * * * *